US005508566A

United States Patent [19]

Nagao et al.

[11] Patent Number: 5,508,566

[45] Date of Patent: Apr. 16, 1996

[54] STARTER FOR STARTING AN ENGINE

[75] Inventors: Yasuhiro Nagao, Okazaki; Tsutomu Shiga, Nukata; Nobuyuki Hayashi, Nagoya; Masanori Ohmi, Anjyo; Masami Niimi, Handa, all of Japan

[73] Assignee: Nippondenso Co., Ltd., Kariya, Japan

[21] Appl. No.: 353,347

[22] Filed: Dec. 5, 1994

[30] Foreign Application Priority Data

| | | | |
|---|---|---|---|
| Dec. 15, 1993 | [JP] | Japan | 5-315549 |
| Sep. 19, 1994 | [JP] | Japan | 6-222325 |

[51] Int. Cl.[6] .................... F02N 11/00; H02P 9/04

[52] U.S. Cl. .................... 290/38 R; 290/48

[58] Field of Search .................... 290/38 A, 38 R, 290/38 B, 38 C; 335/2, 6; 310/248, 89, 68 R, 239; 74/6

[56] References Cited

U.S. PATENT DOCUMENTS

| | | | |
|---|---|---|---|
| 1,941,698 | 1/1934 | Lock | 290/38 |
| 2,332,086 | 10/1943 | Jones | 290/38 |
| 2,396,986 | 3/1946 | Buxton | 290/38 |
| 2,644,098 | 6/1953 | Miller | 290/38 |
| 3,553,504 | 1/1971 | Balcke | 310/68 |
| 4,342,934 | 8/1982 | van Wijhe et al. | 310/239 |
| 5,148,073 | 9/1992 | Tamura | 310/239 |

FOREIGN PATENT DOCUMENTS

| | | |
|---|---|---|
| 1105688 | 6/1954 | France . |
| 2552823 | 4/1985 | France . |
| 964675 | 7/1964 | United Kingdom . |
| 1145737 | 3/1969 | United Kingdom . |

*Primary Examiner*—Thomas M. Dougherty
*Assistant Examiner*—Christopher Cuneo
*Attorney, Agent, or Firm*—Cushman, Darby & Cushman

[57] ABSTRACT

A starter for starting an engine with a ring gear includes a starter motor having a plurality of field poles disposed around an inner periphery thereof, an output shaft for transmitting rotation of the starter motor, a pinion mounted on the output shaft for meshing with the ring gear, and a magnet switch including a fixed contact and a plunger with a movable contact, which abuts the fixed contact. By moving the plunger and causing the movable contact, to abut the fixed contact electrical current is passed to the starter motor. The magnet switch is disposed in an end of the starter opposite an end where the pinion is disposed, with the plunger being disposed orthogonal to a longitudinal axis of the starter motor. The starter disclosed herein reduces the axial and diametral lengths and overall volume of the starter.

18 Claims, 20 Drawing Sheets

STARTER FOR STARTING AN ENGINE

CROSS REFERENCE TO RELATED APPLICATIONS

This application is based upon and claims priority from Japanese Patent Application No. 5-315549, filed Dec. 15, 1993 and No. 6-222325 filed Sep. 19, 1994, the contents of which are incorporated herein by reference.

BACKGROUND OF THE INVENTION

1. Field of the Invention

This invention relates to a starter for starting an engine. More particularly, this invention relates to a starter for an automotive engine.

2. Related Art

Among conventional starters, as shown in Japanese Patent Publication No. Heisei (JP-A) 1-92573, a coaxial-type starter provided with a motor and a pinion rotatably disposed axially in front of the motor to be driven by the motor and a magnet switch disposed adjacent to the rear portion of the motor is described. In this starter, a coaxial construction is used, with a plunger of the magnet switch passing through the inside of a rotary shaft of the motor and axially urging the pinion in front of the motor. If such a construction is adopted, due to the disposition of the magnet switch behind the motor, the required area as viewed from the axial direction of the starter can be markedly reduced compared to conventional starters wherein the magnet switch is disposed on and in parallel with the starter motor.

However, in conventional starters, although the required area seen from the axial direction can be reduced, the plunger of the magnet switch is disposed on the same axis as the shaft of the motor, which causes problems. To secure a predetermined distance for axial movement of the plunger, there is the problem that the axial length of the starter naturally becomes extremely long.

SUMMARY OF THE INVENTION

The present invention having been developed in view of the problems associated with conventional devices, has a primary object to provide a starter in which while the required area seen from the axial direction is reduced, there is no great increase of the axial length of the starter.

The present invention has a secondary object to provide a starter in which a magnet switch may be encased within a diametral length of a starter motor by the reduction in size, less influenced by vibration of an engine or the like, less influential on magnetic field in the starter motor, and/or kept in position securedly.

The present invention has a further object to provide a starter in which a pinion moving mechanism driven by the magnet switch will not require enlargement of diametral length of overall configuration.

In the starter according to the present invention, includes, as major components, a starter motor having a plurality of field poles disposed around an inner periphery thereof, an output shaft which transmits the rotation of the starter motor, a pinion mounted on this output shaft which meshes with a ring gear of an engine, and a magnet switch having a fixed contact and a plunger having a movable contact which abuts with this fixed contact. By moving the plunger and causing the movable contact to abut with the fixed contact allows electricity to pass to the starter motor. Further, the plunger is disposed in the vicinity of the end of the starter motor opposite to the pinion with the plunger being orthogonal to the axis of the starter motor.

In the starter according to the present invention, because by disposing the magnet switch in the vicinity of the end of the starter motor opposite to the pinion with the plunger being orthogonal to the axis of the starter motor, it is possible to effectively use the diameter of the starter motor for the movement of the plunger. The magnet switch can easily be accommodated within the diameter of the motor. As a result, in both the axial length as well as the diameter of the magnet switch, it is possible to reduce the axial directional length of the whole starter.

BRIEF DESCRIPTION OF THE DRAWINGS

Other objects, features and characteristics of the present invention as well as the functions of interrelated parts will become apparent to a person of ordinary skill in the art from a study of the following detailed description, appended claims, and attached drawings, all of which form a part of this application. In the drawings:

DETAILED DESCRIPTION OF THE PRESENTLY PREFERRED EXEMPLARY EMBODIMENTS

Figure 1:
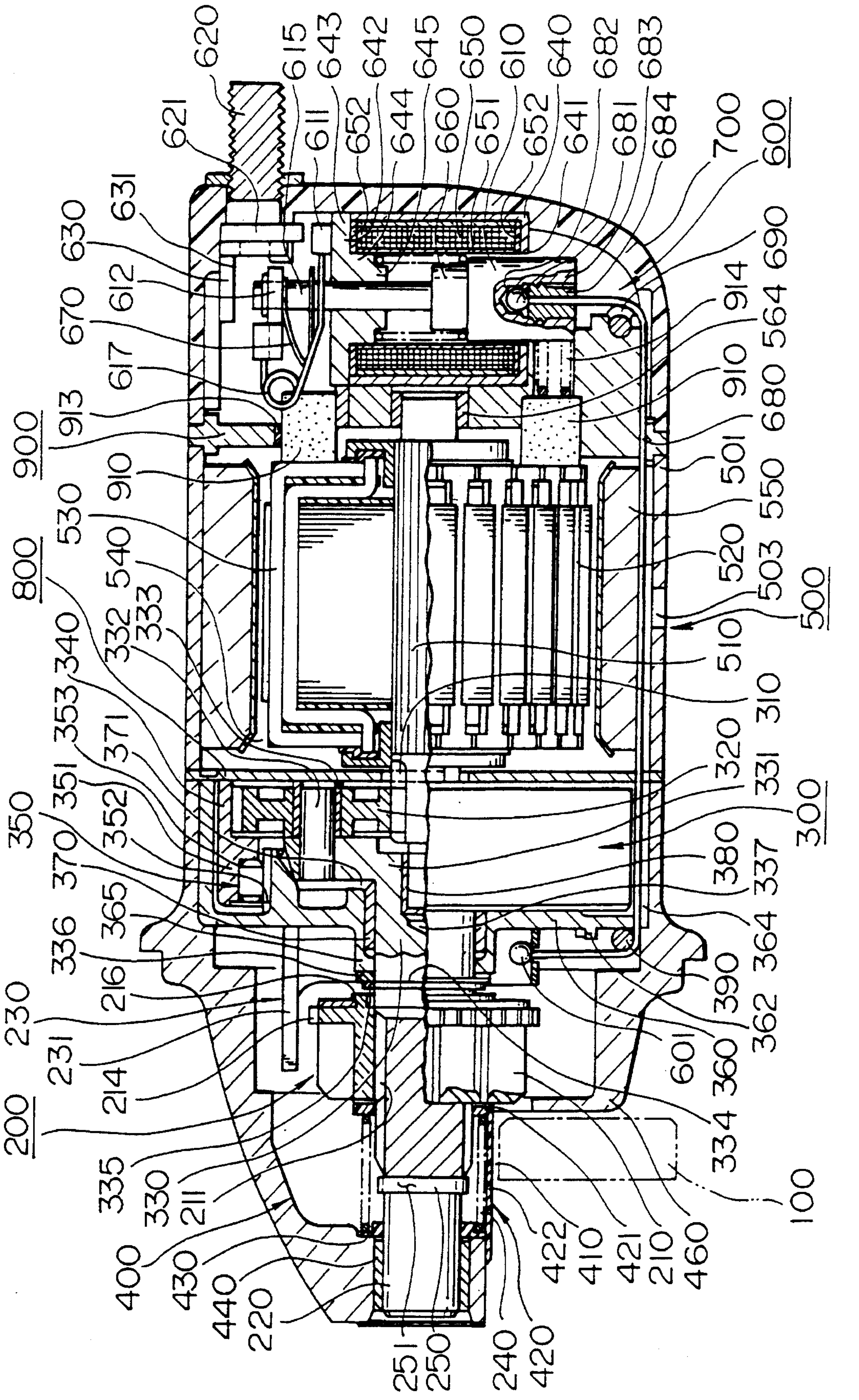
FIG. 1 is a cross-sectional side view showing the first embodiment of the starter of the present invention.
Figure 2:
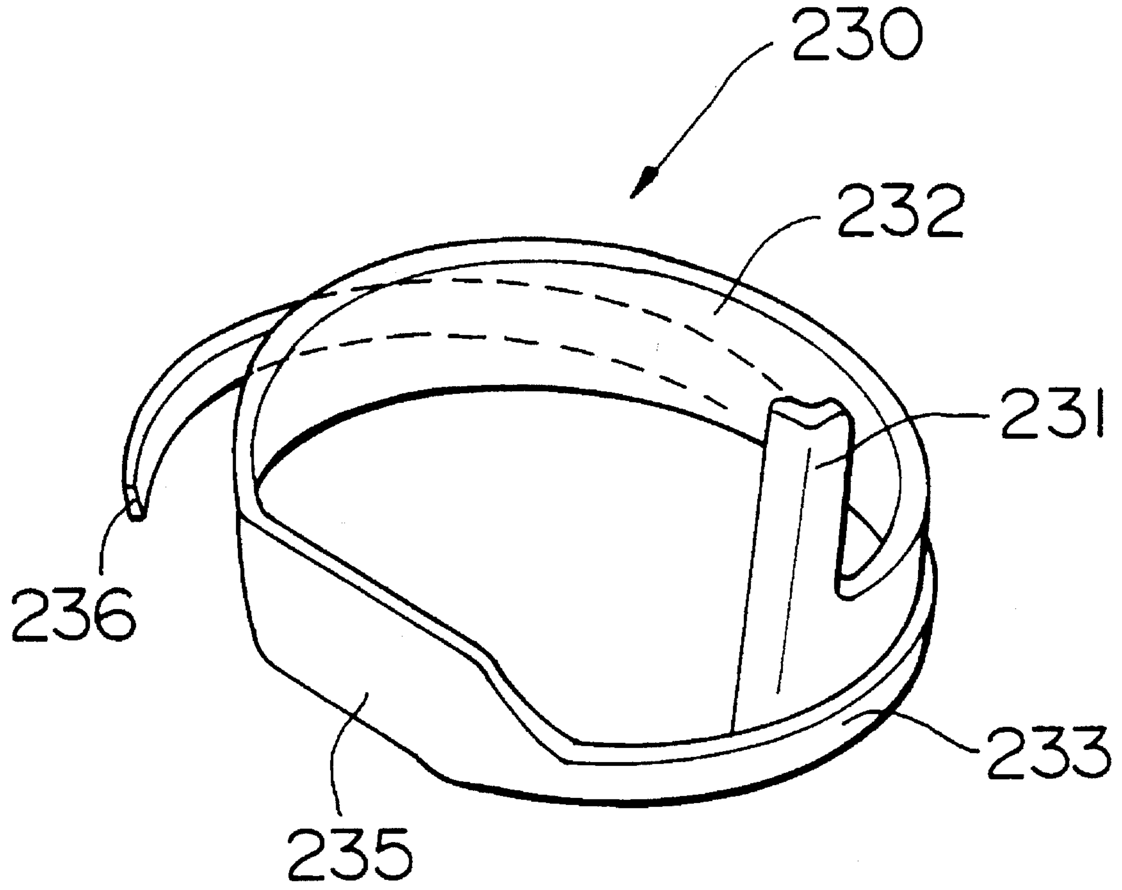
FIG. 2 is a perspective view of a pinion rotation limiting member used in the embodiment of FIG. 1.

The starter according to the present invention will be described in detail based on the embodiments shown in FIG. 1 through FIG. 31.

The starter can be generally divided into housing 400 containing pinion 200 which meshes with ring gear 100 mounted on an engine (not shown) and planetary gear mechanism 300. The starter further includes motor 500, and end frame 700 containing magnet switch 600. Inside the starter, housing 400 with a through hole 503 and motor 500 are separated by motor spacer wall 800, and motor 500 and end frame 700 are separated by brush holding member 900.

Pinion

Figure 3A:
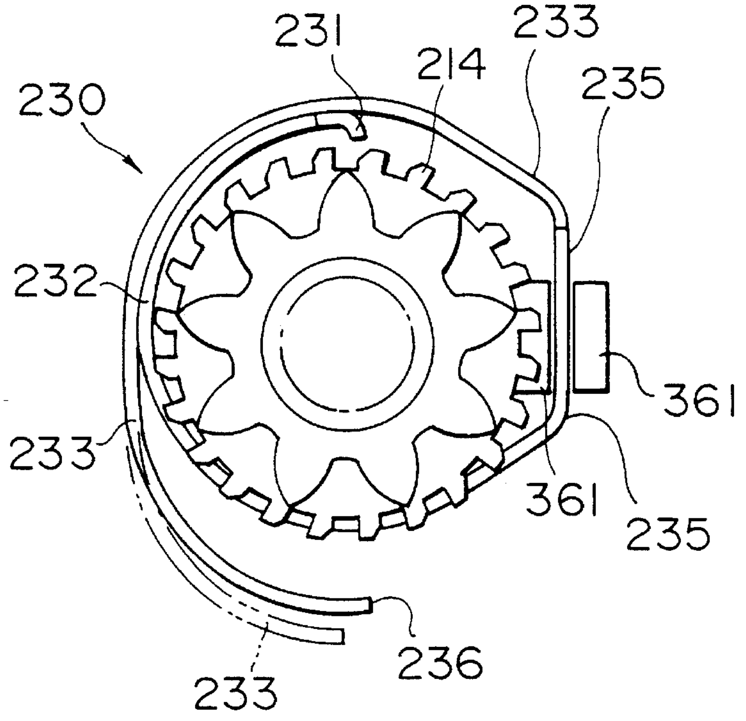
FIGS. 3A and 3B are a front view and a partial sectional side view of a pinion rotation limiting member fitted to a pinion part, respectively.
Figure 3B:
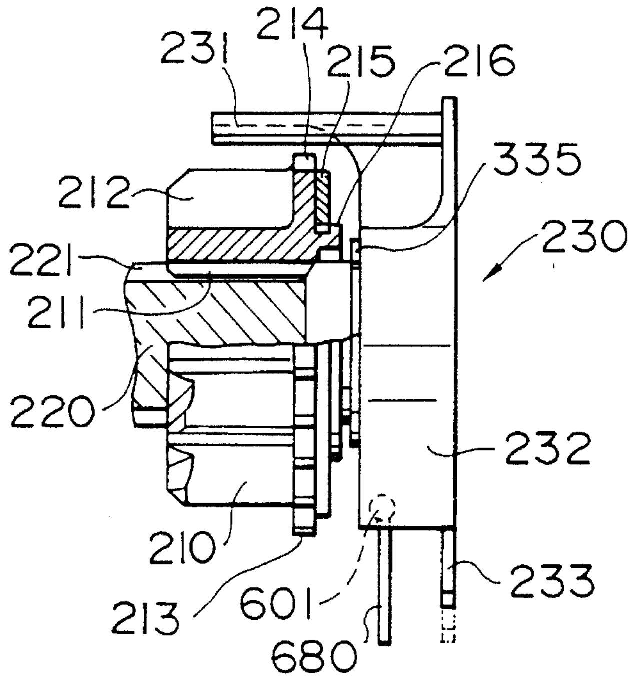

As shown in FIGS. 1, 3A and 3B, pinion gear 210 which meshes with the ring gear 100 is formed on pinion 200. Pinion helical spline 211 which mates with helical spline 221 formed on output shaft 220 is formed around the inner surface of the pinion gear 210.

On the side of pinion gear 210 opposite from the ring gear 100, flange 213 of greater diameter than the external diameter dimension of pinion gear 210 is formed in circular form. A number of projections 214 greater than the number of outer teeth of pinion gear 210 are formed around the entire outer circumference of flange 213. Projections 214 are for limiting claw 231 of pinion rotation limiting member 230, which will be discussed below, and projections 214 mate with claw 231. Washer 215 is bent onto the outer peripheral side of annular portion 216 formed on the rear end of pinion gear 210 and is thereby disposed rotatably and unable to come off in the axial direction at the rear surface of the flange 213.

The pinion gear 210 is urged toward the rear of the output shaft 220 at all times by return spring 240 consisting of a compression coil spring. Return spring 240 not only urges pinion gear 210 directly but in this embodiment urges pinion gear 210 by way of ring body 421 of shutter 420, which opens and closes opening portion 410 of housing 400 and will be further discussed below.

Pinion Rotation Limiting Member

Pinion rotation limiting member 230, as shown in FIGS. 2, 3A, 3B and 6 in further detail, is a sheet spring member wound through approximately 1 and ½ turns of which approximately ¾ turn is rotation limiting portion 232 (FIGS. 2, 3A, and 3B) of long axial sheet length and high spring constant and the remaining approximately ¾ turn is return spring portion 233 constituting urging means of short axial sheet length and low spring constant.

Limiting claw 231 which constitutes a limiting portion extending in the axial direction and which mates with multiple projections 214 formed in flange 213 of pinion gear 210 is formed at one end of rotation limiting portion 232. Limiting claw 231, as well as mating with projections 214 of pinion gear 210, in order to increase the rigidity of limiting claw 231, is formed to have an axially long length and is bent radially inward into a cross-sectional L-shape. That is, limiting claw 231 is bar-like.

Rotation limiting portion 232 is provided with a straight portion 235 which extends vertically. Straight portion 235 is vertically slidably supported by two supporting arms 361 (FIG. 3A) mounted projecting from the front surface of center bracket 360 shown in FIGS. 4 through 6 in detail. That is, straight portion 235, which moves vertically, causes the rotation limiting portion 232 to move vertically also.

Also, sphere 601 (FIG. 3B) of the front end of cord-shaped member 680. e.g., a wire, which will be further described below, for transmitting the movement of magnet switch 600, also described below, is in engagement with the lower end of the curvature of the rotation limiting portion 232, the position 180° opposite the limiting claw 231.

The end portion side of return spring portion 233 has a large curvature of winding and one end portion 236 of return spring portion 233 abuts with the upper surface of limiting shelf 362 mounted projecting from a front surface of a lower portion of center bracket 360.

Figure 6:
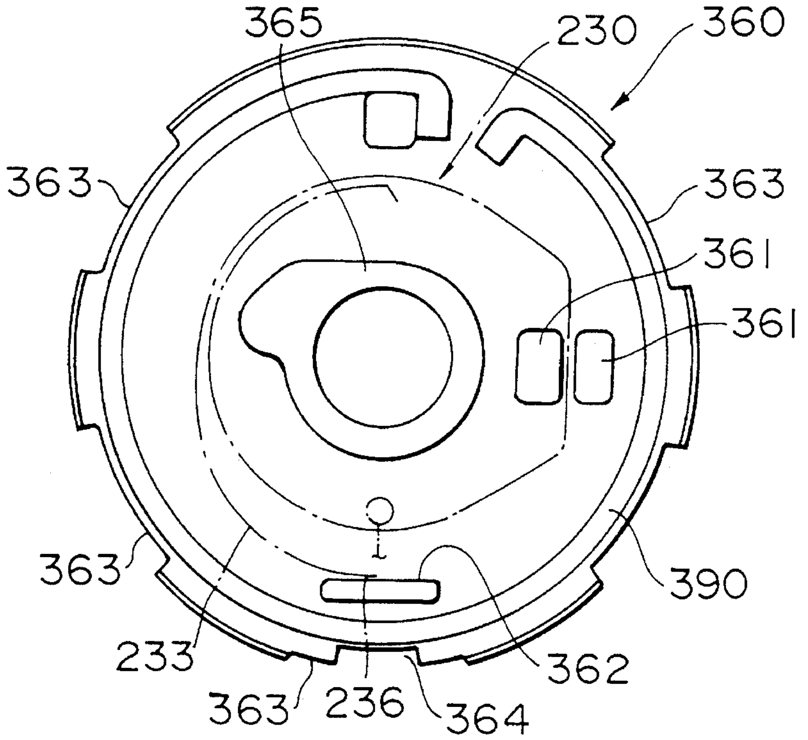
FIG. 6 is a front view of a center bracket.

The operation of pinion rotation limiting member 230 will now be explained. Cord-shaped member 680 serves as the transmitting means for transmitting the movement of magnet switch 600 to limiting claw 231. The movement of magnet switch 600 pulls rotation limiting portion 232 downward and causes limiting claw 231 to engage with projections 214 on flange 213 of pinion gear 210. At that time, because end portion 236 of the return spring portion 233 is in abutment with limiting shelf 362 for position limiting as shown in FIG. 6, return spring portion 233 bends. Because limiting claw 231 is in engagement with projections 214 on the pinion gear 210, when pinion gear 210 starts rotation due to rotation of armature shaft 510 of motor 500 and planetary gear mechanism 300, pinion gear 210 advances along helical spline 221 on output shaft 220. When pinion gear 210 abuts with ring gear 100 and the advance of pinion gear 210 is obstructed, further rotational force of pinion gear 210 causes pinion rotation limiting member 230 itself to bend and pinion gear 210 rotates slightly and meshes with ring gear 100. When pinion gear 210 advances, limiting claw 231 disengages from projections 214 and then drops in behind flange 213 of pinion gear 210. The front end of limiting claw 231 abuts the rear surface of washer 215 and pinion gear 210 is prevented from receiving the rotation of ring gear 100 of the engine and retreating.

As the movement of magnet switch 600 stops and cord-shaped member 680 stops pulling rotation limiting portion 232 downward, the action of return spring portion 233 causes rotation limiting portion 232 to return to its original position. Because pinion rotation limiting member 230 need only be held with a small force required to limit the rotation of pinion gear 210, it is possible to move pinion limiting member 230 to the side of pinion gear 210 by means of magnet switch 600, using the cord-shaped member 680. Consequently, it is possible to increase the freedom of position where magnet switch 600 is disposed.

Pinion stopping ring 250 is fixed in a circular groove of rectangular cross-section formed around output shaft 220. Pinion stopping ring 250 is a piece of steel of rectangular cross-section processed into a circular shape, substantially S-shaped corrugation 251, e.g. an engaging means, is formed at each end, and one of the convex portions engages with the concave portion of the other end and the convex portion of the other end engages with the concave portion of the first end.

Planetary Gear Mechanism

Planetary gear mechanism 300, as shown in FIG. 1, is a speed reducing means for reducing the rotational speed of motor output shaft 220 relative to that of motor 500, which will be further discussed later, and increasing the output torque of motor 500. Planetary gear mechanism 300 is made up of sun gear 310 formed on the front-side outer periphery of armature shaft 510 (discussed below) of motor 500, a plurality of planetary gears 320 which mesh with sun gear 310 and rotate around the circumference of the sun gear 310, a planet carrier 330 which rotatably supports these planetary gears 320 around the sun gear 310 and is formed integrally with the output shaft 220, and an internal gear 340 which is of a cylindrical shape meshing with the planetary gears 320 at the outer periphery of the planetary gears 320 and is made of resin.

Overrunning Clutch

Overrunning clutch 350 supports internal gear 340 rotatably in one direction only, i.e. only the direction in which it rotates under the rotation of the engine. Overrunning clutch 350 has clutch outer member 351 constituting a first cylindrical portion formed in the front side of internal gear 340, circular clutch inner member 352 constituting a second cylindrical portion formed in the rear surface of center bracket 360 constituting a fixed side covering the front of planetary gear mechanism 300 and disposed facing clutch outer member 351, and rollers 353 accommodated in a roller housing portion formed inclined to the inner surface of clutch outer member 351.

Because overrunning clutch 350 uses center bracket 360, which rotatably supports output shaft 220 by way of a bearing 370, the axial length need not be made long and downsizing of the present invention is achieved.

Center Bracket

Figure 4:
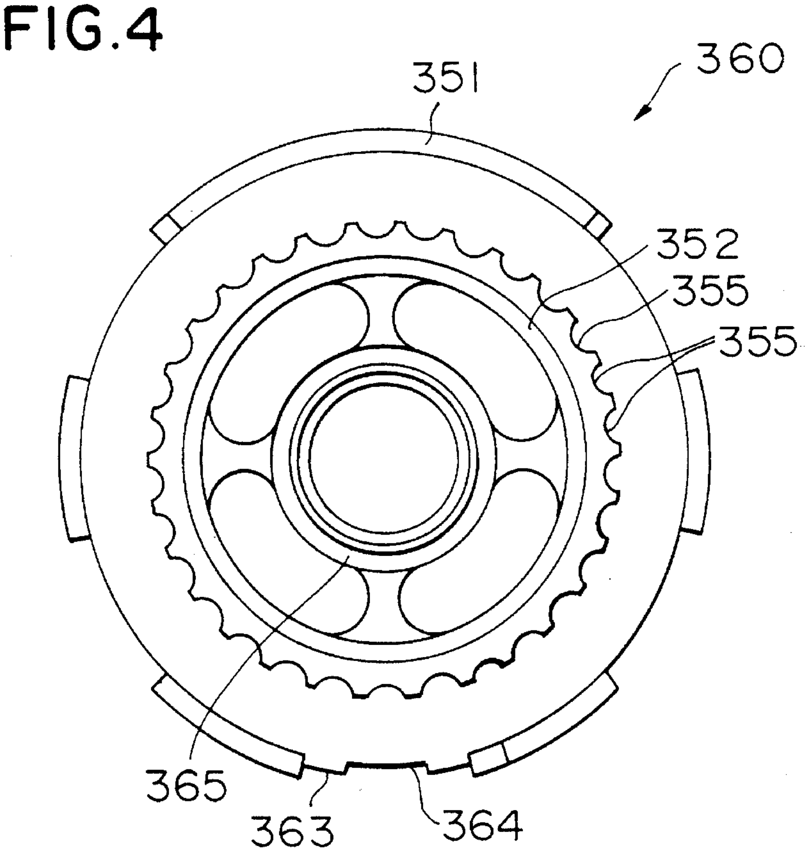
FIG. 4 is a rear view of a center bracket.
Figure 5:
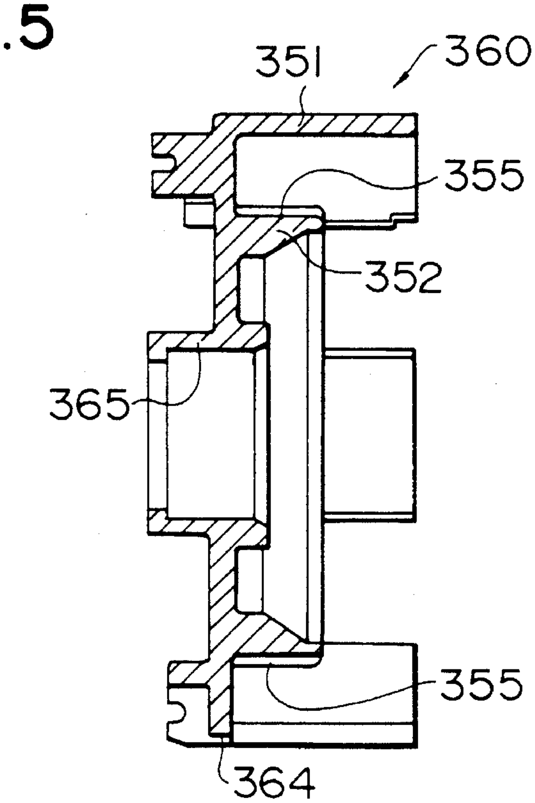
FIG. 5 is a sectional side view of a center bracket.

Center bracket 360 is shown in FIGS. 4 through 6 in detail and is disposed inside the rear end of housing 400. Housing 400 and center bracket 360 are linked by ring spring 390 having one end engaged with housing 400 and the other end engaged with center bracket 360. Further, housing 400 and center bracket 360 are disposed in such a manner so that the rotational reaction received by clutch inner member 352, which forms part of overrunning clutch 350, is absorbed by ring spring 390 and the reaction is not directly transmitted to housing 400.

Two supporting arms 361 (FIG. 3A) which hold pinion rotation limiting member 230 and limiting shelf 362 on which the lower end of pinion rotation limiting member 230 is loaded are mounted on the front surface of center bracket 360. Further, a plurality of cutout portions 363 which mate with convex portions (not illustrated) on the inner side of housing 400 are formed around center bracket 360. The upper side cutout portions 363 are also used as air passages for guiding air from inside housing 400 into yoke 501. Also, concave portion 364 through which cord-shaped member 680 (discussed below) passes in the axial direction is formed at the lower end of center bracket 360.

Planet carrier 330 is provided at its rear end with flange-like projecting portion 331 which extends diametrally radially in order to support planetary gears 320. Pins 332 extending rearward are fixed to flange-like projecting portion 331. Pins 332 rotatably support planetary gears 320 by way of metal bearings 333.

Planet carrier 330 has its front end rotatably supported by housing bearing 440 fixed inside the front end of housing 400 and center bracket bearing 370 fixed inside inner cylindrical portion 365 of center bracket 360. Planet carrier 330 includes circular groove 334 at a front end position of inner cylindrical portion 365, and stopping ring 335 mated with circular groove 334. Between stopping ring 335 and the front end of inner cylindrical portion 365, washer 336 is rotatably mounted with respect to planet carrier 330. By stopping ring 335 abutting with the front end of inner cylindrical portion 365 by way of washer 336, rearward movement of planet carrier 330 is limited. The rear end of center bracket bearing 370, which supports the rear side of planet carrier 330, a flange portion 371 is provided that is sandwiched between the rear end of inner cylindrical portion 365 and flange-like projecting portion 331. Because flange-like projecting portion 331 abuts with the rear end of inner cylindrical portion 365 by way of flange portion 371, forward movement of planet carrier 330 is limited.

Concave portion 337, which extends axially, is provided in the rear surface of planet carrier 330, and the front end of armature shaft 510 is rotatably supported by way of planet carrier bearing 380 disposed in concave portion 337.

Housing

Housing 400 supports output shaft 220 via housing bearing 440 fixed in the front end of housing 400. Further, housing 400 is provided with water barrier wall 460, which minimizes the gap at the lower part of opening portion 410 between the outer diameter of pinion gear 210 and housing 400 in order to minimize the unwanted entering of rainwater and the like therethrough. Also, two slide grooves, which extend axially, are provided at the lower part of the front end of housing 400. Shutter 420, which will be further described below, is disposed in slide grooves.

Operation of Shutter

The operation of shutter 420 is such that when the starter begins operation, and pinion gear 210 shifts forward along output shaft 220, ring body 421 shifts forward together with pinion gear 210. When this happens, water-barrier portion 422, which is integral with ring body 421, shifts forward and opens opening portion 410 of housing 400. When the starter stops operating and pinion gear 210 shifts backward along output shaft 220, ring body 421 also shifts backward together with pinion gear 210. When this happens, water-barrier portion 422, which is integral with ring body 421, also shifts backward and closes opening portion 410 of housing 400. As a result, shutter 420, which constitutes opening and closing means, by means of the water-barrier portion 422, prevents rainwater and the like, which is splashed by the centrifugal force of ring gear 100, from entering housing 400 when the starter is not in operation.

Seal Member

Seal member 430 seals around output shaft 220 and prevents rainwater, dust, and other contaminants, which have entered through opening portion 410 of housing 400, from entering housing bearing 440 in the front end of housing 400.

Motor

Motor 500 will now be described with reference to FIGS. 1 and 7 through 15 in particular. Motor 500 is enclosed by yoke 501, motor spacer wall 800, and brush holding member 900, which will be described below. Motor spacer wall 800 houses planetary gear mechanism 300 between itself and center bracket 360, and fulfills the role of preventing lubricating oil inside the planetary gear mechanism 300 from entering into motor 500.

Motor 500, as shown in FIG. 1, is made up of armature 540 comprising armature shaft 510 and armature core 520 and armature coils 530 which are mounted on armature core 520 and rotate integrally with armature shaft 510. Fixed poles 550 rotate armature 540, with fixed poles 550 being mounted around the inside of yoke 501.

Armature Shaft

Armature shaft 510 is rotatably supported by planet carrier bearing 380 inside the rear portion of planet carrier 330 and brush holding member bearing 564 mounted inside brush holding member 900. The front end of armature shaft 510 passes into the inside of planetary gear mechanism 300, and as described above sun gear 310 of planetary gear mechanism 300 is formed on the outer periphery of the front end of armature shaft 510.

Armature Coil

Figure 7:
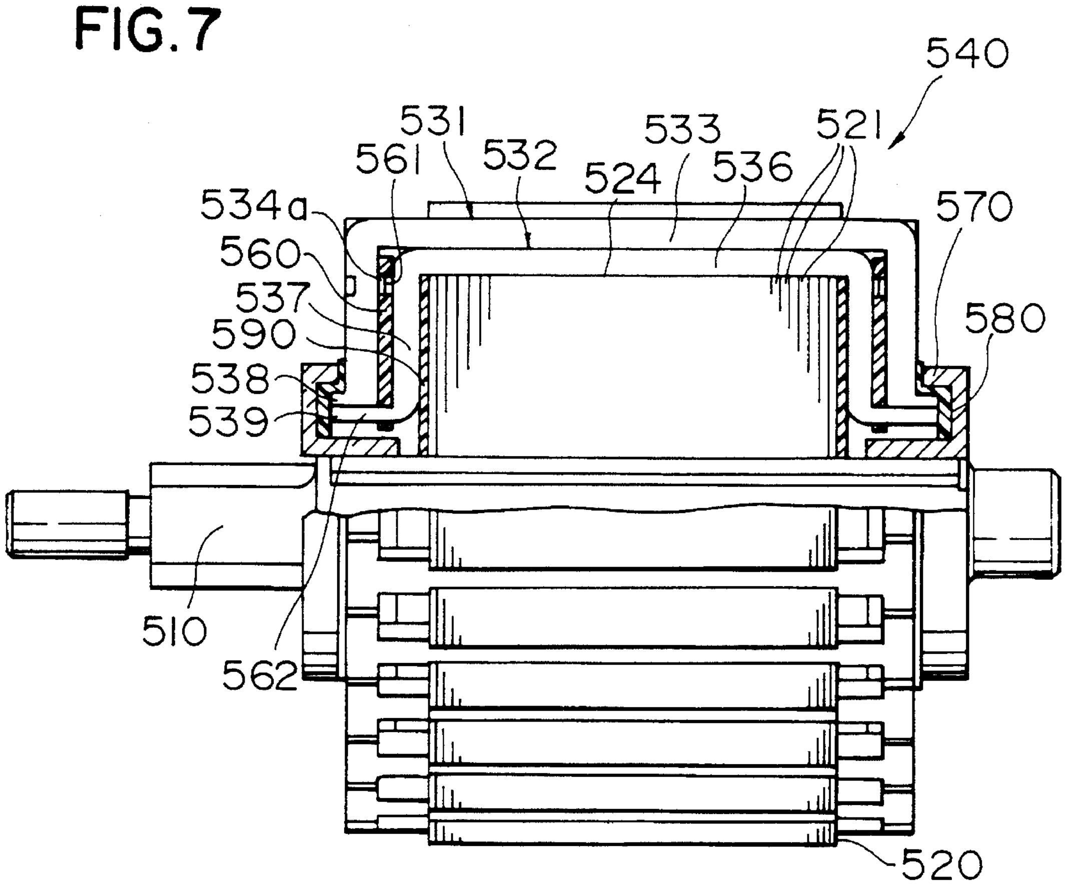
FIG. 7 is a sectional side view of an armature.
Figure 10:
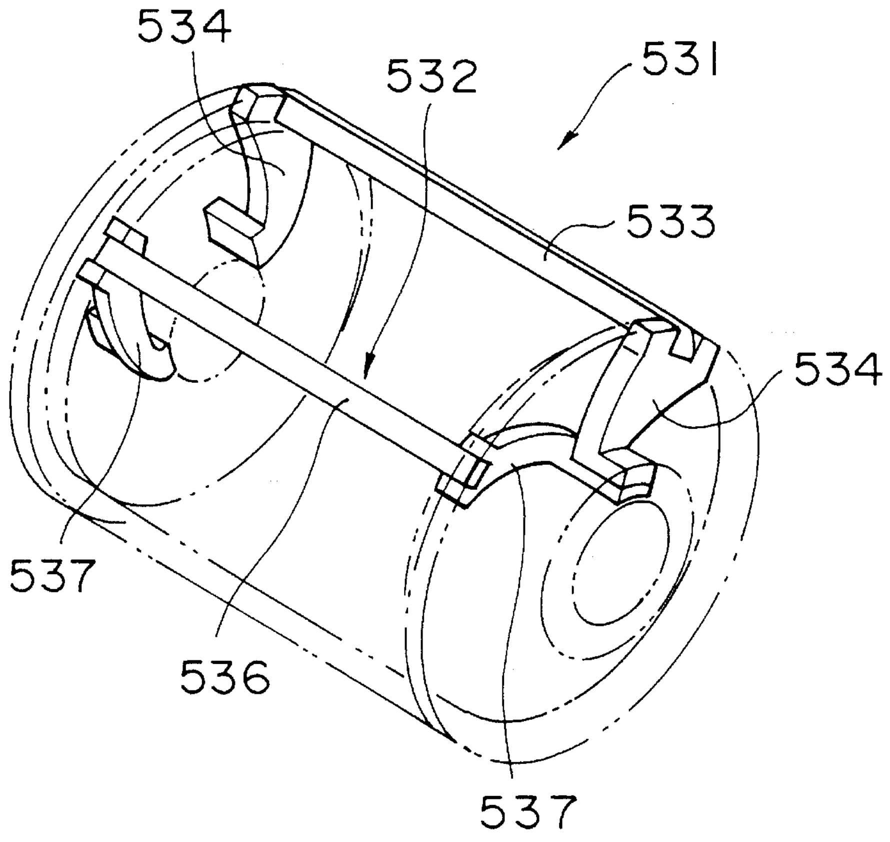
FIG. 10 is an outline perspective view showing arrangement of an upper coil bar and a lower coil bar in the first embodiment.
Figure 11:
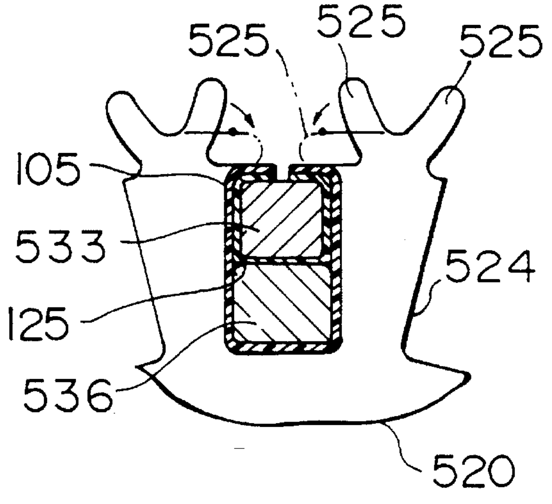
FIG. 11 is a sectional view of an upper coil arm and a lower coil arm received in a slot.

As shown in FIGS. 7, 10 and 11 in detail, for armature coils 530, e.g. twenty-five, upper layer coil bars 531 and an equal number of lower layer coil bars 532 are used. Two-layer-winding coils wherein the respective upper layer coil bars 531 and lower layer coil bars 532 are stacked in the radial direction are employed. Upper layer coil bars 531 and lower layer coil bars 532 are paired, and the ends of upper layer coil bars 531 and the ends of lower layer coil bars 532 are electrically connected to constitute ring-shaped coils.

Upper Layer Coil Bars

Upper layer coil bars 531 are made of a material having excellent electrical conductivity, e.g. copper, and each is provided with upper layer coil arm 533 which extends axially in parallel with fixed poles 550 and is held in the outer sides of slots 524 and two upper layer coil ends 534, which are bent inward from both ends of upper layer coil arm 533, extend axially in a direction orthogonal to the axial direction of armature shaft 510. Upper layer coil arm 533 and two upper layer coil ends 534 may be a member integrally molded by cold casting, may be a member shaped by bending in a press into a U-shape, or may be a member formed by joining an upper layer coil arm 533 and two upper layer coil ends 534 made as separate parts by a joining method such as welding.

Figure 8:
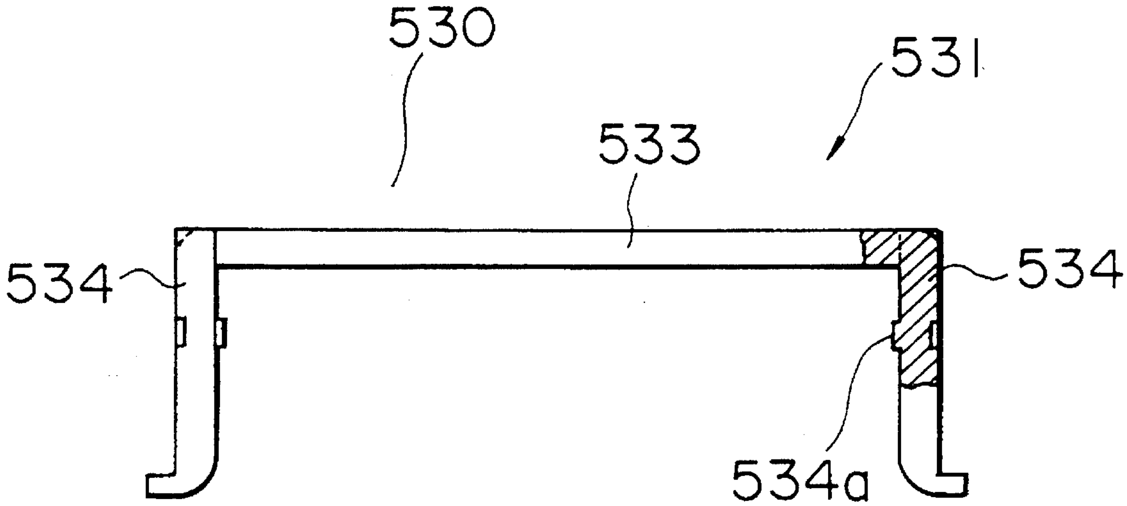
FIG. 8 is a side view of an upper coil bar.
Figure 9:
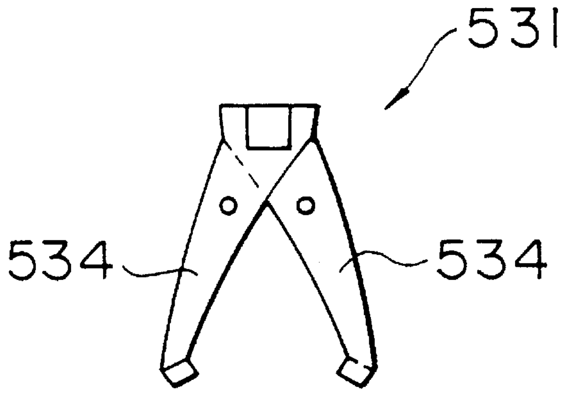
FIG. 9 is a front view of an upper coil bar.

Upper layer coil arm 533, as shown in FIGS. 8 through 10, is a straight bar having a rectangular cross-section and, as shown in FIG. 11, has its periphery covered with an upper layer insulating film 125 (for example a resin thin film such as nylon, or paper), is firmly received in slots 524 together with lower layer coil arm 536 which will be described below.

As shown in FIG. 10, of the two upper layer coil ends 534, one upper layer coil end 534 is mounted slanting forward with respect to the direction of rotation and the other upper layer coil end 534 is mounted slanting rearward with respect to the direction of rotation. The angles of slant of the two upper layer coil ends 534 with respect to the radial direction are the same angles of slant with respect to upper layer coil arm 533, and the two upper layer coil ends 534 are of identical shape. As a result, even when upper layer coil bar 531 is reversed through 180°, upper layer coil bar 531 has the same shape as before it was reversed. In other words, because there is no distinction between the two upper layer coil ends 534, the workability when assembling upper layer coil bar 531 to armature core 520 is excellent.

Of the two upper layer coil ends 534, upper layer coil end 534 disposed on the side of magnet switch 600 directly abuts with brush 910 which will be described below and passes electrical current to armature coils 530. Therefore, at least the surface of upper layer coil end 534 with which brush 910 abuts is processed to be smooth. In the starter of this embodiment, it is not necessary to provide an independent commutator to conduct electrical current to the armature coils 530. Because an independent commutator becomes unnecessary, it is possible to reduce the number of components and reduce the number of processes entailed in manufacturing the starter, and the production cost can be decreased. Also, because the need to dispose an independent commutator inside the starter is eliminated, the starter can be made compact in the axial direction.

Lower Coil Bars

Lower coil bars 532, like upper coil bars 531, are made from a material having excellent electrical conductivity such as copper. Each coil bar 532 comprises lower layer coil arm 536 which extends axially in parallel with respect to fixed poles 550 and is held in the inner sides of slots 524 and two lower layer coil ends 537 which are bent inward from the ends of lower layer coil arm 536 and extend orthogonal to the axial direction of armature shaft 510. Lower layer coil arm 536 and two lower layer coil ends 537, like upper layer coil bar 531, may be a member integrally molded by cold casting, may be a member shaped by bending in a press into a U-shape, or may be a member formed by joining lower layer coil arm 536 and two lower layer coil ends 537 made as separate parts by a joining method such as welding.

Insulation between upper layer coil ends 534 and lower layer coil ends 537 is secured by insulating spacers 560 (FIG. 12), and insulation between lower layer coil ends 537 and armature core 520 is secured by an insulating ring 590 (FIG. 7) made of resin, e.g. nylon or phenol resin.

Lower layer coil arm 536, as shown in FIGS. 10 and 11, is a straight bar of rectangular cross-section and, as shown in FIG. 11, is firmly received in slots 524 together with upper layer coil arm 533 by bending nails 525. The lower layer coil arm 536 is covered with a lower insulating film, e.g. nylon or paper, and is received in slots 524 together with upper layer coil arm 533 covered with the upper insulating film 105.

The inner end portions of lower layer coil ends 537 at both ends are provided with lower layer inner extension portions 539 extending axially. The outer peripheral surfaces of lower layer inner extension portions 539 mate with concave portions 562 formed in inner peripheries of insulating spacers 560 (FIG. 12) and overlap with and are electrically and mechanically connected by a joining method such as welding to the inner peripheries of upper layer inner extension portions 538 of the end portions of upper layer coil ends 534. The inner peripheries of lower layer inner extension portions 539 are disposed clear of and insulated from armature shaft 510.

The inner ends of the two upper layer coil ends 534 are provided with upper layer inner extension portions 538 extending axially. The inner peripheral surfaces of these upper layer inner extension portions 538 overlap with and are electrically and mechanically connected by a joining method such as welding to the outer peripheries of lower layer inner extension portions 539 of the inner ends of lower layer coil bars 532 discussed above. The outer peripheral surfaces of the upper layer inner extension portions 538 abut via insulating caps 580 (FIG. 14) with the inner surface of outer circular portion 571 of fixing member 570 (FIG. 13) press-fixed to armature 510.

Insulating Spacer

Figure 12:
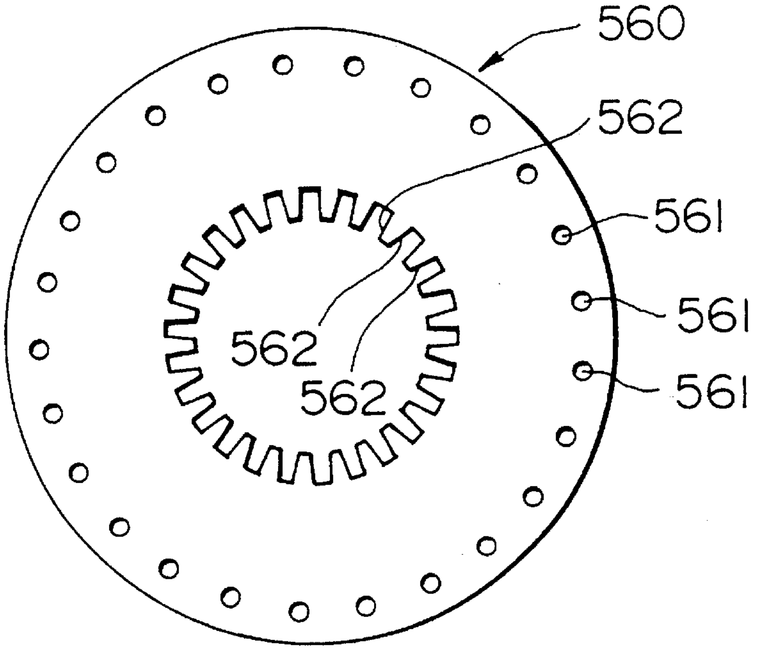
FIG. 12 is a front view of an insulating spacer.

As shown in FIG. 12, insulating spacers 560 are thin plate rings made of resin, e.g. epoxy resin, phenol resin, or nylon. Spacers 560 have a plurality of holes 561 with which projections 534*a* (FIG. 8) of upper layer coil ends 534 mate and is formed in the outer peripheral sides thereof. Concave portions 562 with which lower layer inner extension portions 539 on the inner sides of lower layer coil ends 537 are mated are formed at the inner periphery of insulating spacers 560. Holes 561 and concave portions 562 of insulating spacers 560, as will be described below, are used for positioning and fixing armature coils 530.

Fixing Member

Figure 13:
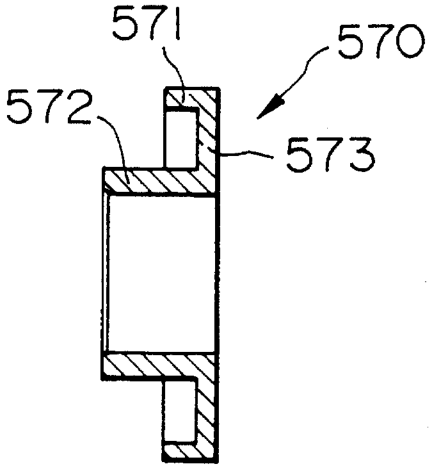
FIG. 13 is a sectional side view of a fixing member.
Figure 14:
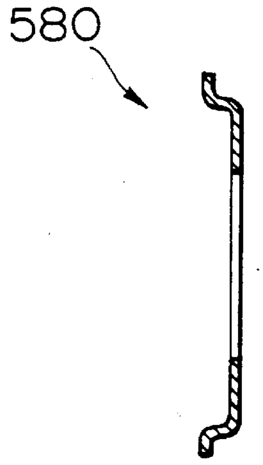
FIG. 14 is a sectional view of an insulating cap.

Fixing members 570, as shown in FIG. 13, each comprise inner circular portion 572 press-fitted on armature shaft 510, limiting ring 573 extending perpendicular to the axial direction for preventing upper layer coil ends 534 and lower layer coil ends 537 from spreading axially, and outer circular portion 571 which encloses upper layer inner extension portions 538 of upper layer coil ends 534 and prevents the inner diameters of armature coils 530 from spreading radially due to centrifugal force. In order to secure insulation between them and upper layer coil ends 534 and lower layer coil ends 537, fixing members 570 have disc-shaped insulating caps 580 shown in FIG. 14 made of resin, e.g. nylon, interposed therebetween.

In armature 540, because upper layer coil ends 534 at the ends of upper layer coil bars 531 which constitute armature coils 530 and lower layer coil ends 537 at the ends of lower layer coil bars 532 are all mounted orthogonal to the axial direction of armature shaft 510 and consequently the axial dimension of armature 540 can be made short, the axial dimension of the motor 500 can also be made short, and as a result the starter can be made more compact than in the conventional starters.

In this embodiment, because magnet switch 600 is disposed in the space resulting from shortening of the axial dimension of motor 500 and the shortening space created by dispensing with independent commutators, although compared to conventional starters the axial direction dimension is not much different, but because the space occupied by magnet switch 600 which has conventionally been mounted above motor 500 becomes unnecessary, the volume occupied by the starter can be made considerably smaller than in the conventional starters.

Fixed Poles

Figure 15:
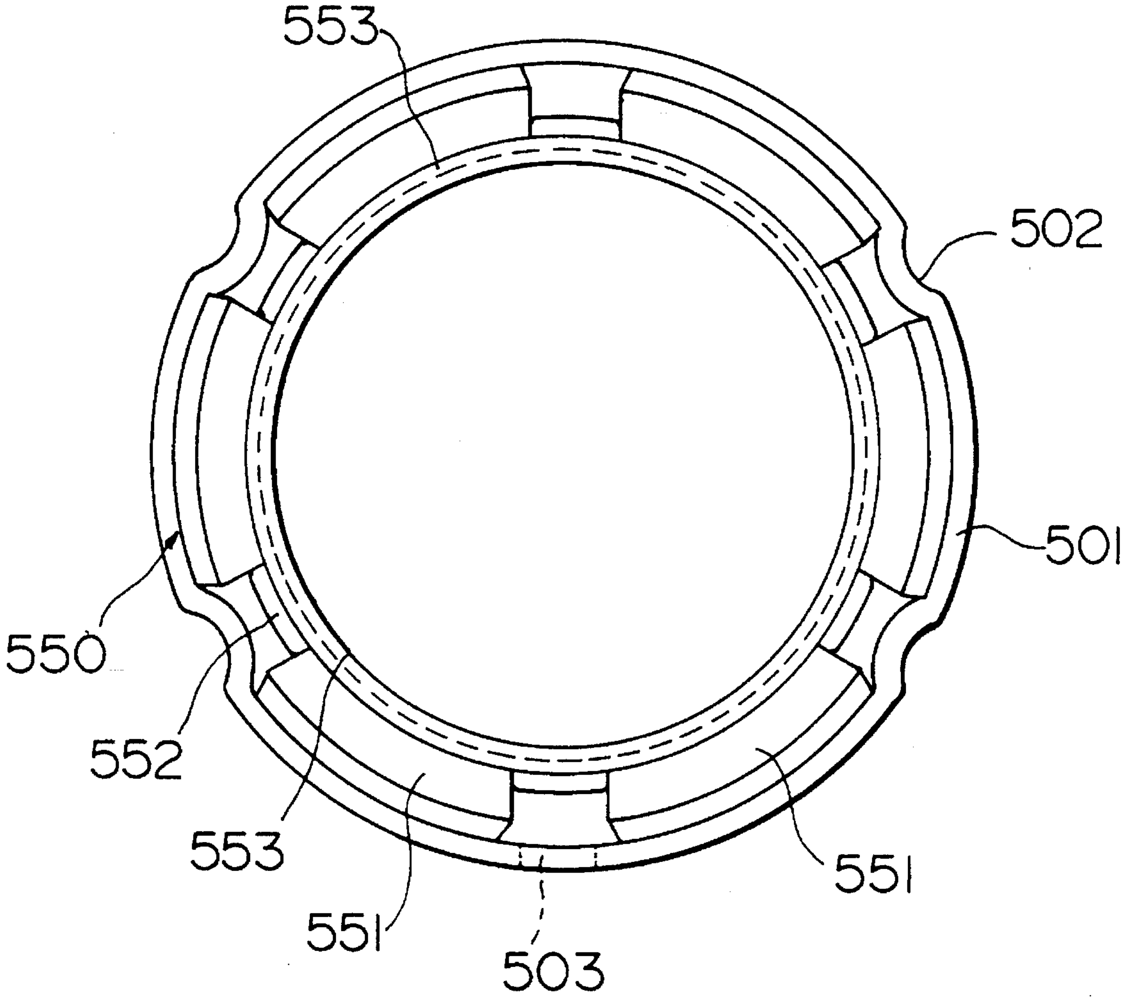
FIG. 15 is a sectional side view of a yoke.

In this embodiment permanent magnets are used for fixed poles 550 and, as shown in FIG. 15, fixed poles 550 comprise a plurality of, e.g. six, main poles 551 and inter-pole poles 552 disposed between main poles 551. Field coils which generate magnetic force by electrical current flow may be used instead of permanent magnets as fixed poles 550.

Main poles 551 are positioned by the ends of the inner sides of channel grooves 502 in yoke 501, and are fixed in yoke 501 by fixing sleeves 553 disposed around the inside of fixed poles 550 with inter-pole poles 552 disposed between main poles 551.

Magnet Switch

Figure 16:
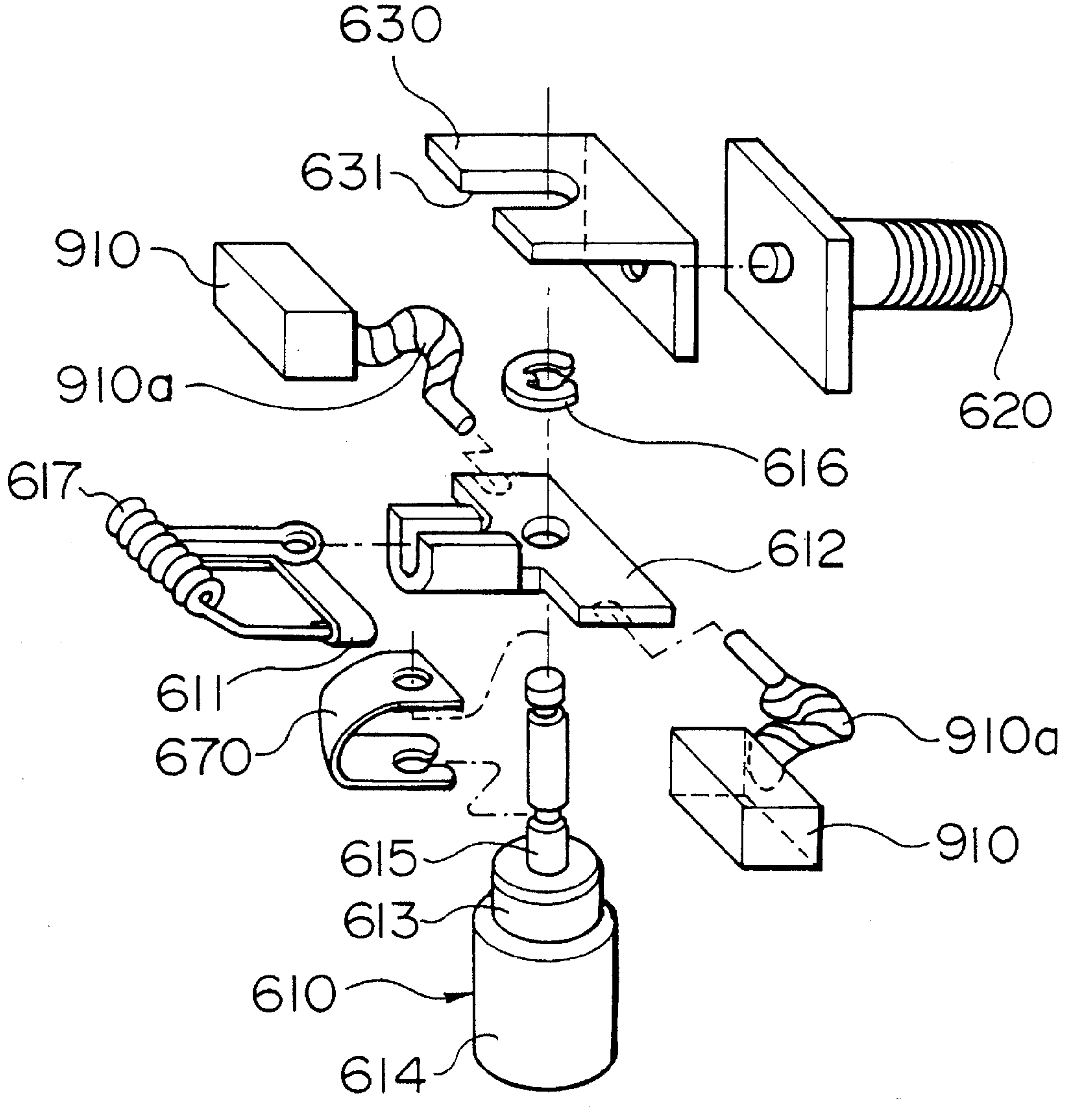
FIG. 16 is an exploded perspective view of a plunger and contact points of a magnet switch.
Figure 17:
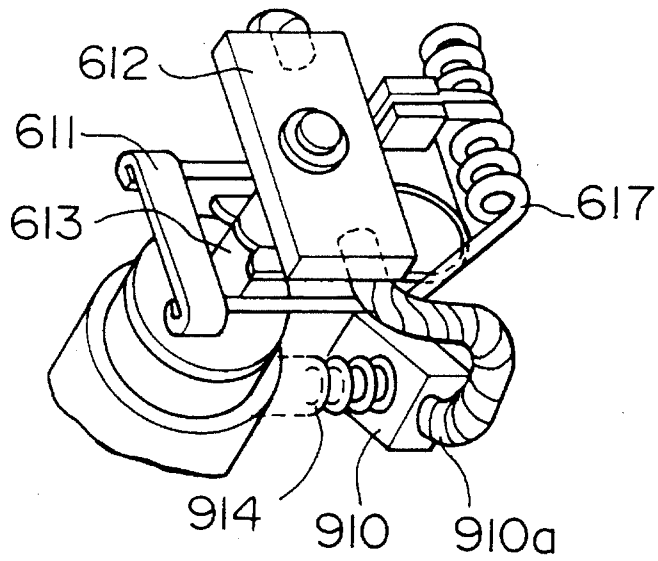
FIG. 17 is a perspective view showing a plunger of a magnet switch.

Magnet switch 600, as shown in FIGS. 1, 16, and 17, is held in brush holding member 900, which will be described below, and is disposed inside end frame 700, also described below, and is fixed so as to be roughly orthogonal to armature shaft 510. In magnet switch 600, electrical current drives plunger 610 upward in the figures, and two contacts, lower movable contact 611 and upper movable contact 612, which move together with plunger 610 are sequentially caused to abut with head 621 of terminal bolt 620 and an abutting portion 631 of fixed contact 630. A battery cable (not illustrated) is connected to terminal bolt 620.

Magnet switch 600 is structured inside magnet switch cover 640 which is cylindrical and has a bottom and is made from magnetic parts, e.g. iron parts. Magnet switch cover 640 is, for example, a pliable steel plate press-formed into a cup shape, and in the center of the bottom of magnet switch cover 640 there is hole 641 through which plunger 610 passes movably in the vertical direction. Also, the upper opening of magnet switch cover 640 is closed off by stationary core 642 made of a magnetic body, e.g. iron.

Stationary core 642 consists of upper large diameter portion 643, lower middle diameter portion 644, and still lower small diameter portion 645. Further, stationary core 642 is fixed in the upper opening of magnet switch cover 640 by the outer periphery of large diameter portion 643 by being caulked to the inner side of the upper end of magnet switch cover 640. The upper end of attracting coil 650 is fitted around middle diameter portion 644. The upper end of compression coil spring 660 which urges the plunger 610 downward is fitted around the periphery of small diameter portion 645 of stationary core 642.

Attracting coil 650 is an attracting means that generates magnetism when a current flows therethrough and attracts plunger 610. Attracting coil 650 is provided with sleeve 651 which has its upper end fit to middle diameter portion 644 of stationary core 642 and covers plunger 610 slidably in the vertical direction. Sleeve 651 is made by rolling up a non-magnetic thin plate, e.g. a copper, brass, or stainless steel plate. Insulating washers 652 made of resin or the like are provided at the upper and lower ends of sleeve 651. Around sleeve 651 between these two insulating washers 652, there is wound a thin film (not illustrated) made of resin, i.e. cellophane or nylon film, or paper, and around that insulating film is wound a predetermined number of turns of a thin enamel wire, thus forming attracting coil 650.

Plunger 610 is made of a magnetic metal, e.g. iron, and has a substantially cylindrical shape. Plunger 610 includes upper small diameter portion 613 and lower large diameter portion 614. The lower end of compression coil spring 660 is fit to small diameter portion 613, and large diameter portion 614, which is relatively long, is held slidably vertically in sleeve 651.

Plunger shaft 615 extends upward from plunger 610 and is fixed to the upper end of plunger 610. Plunger shaft 615 projects upward through a through hole provided in stationary core 642. Upper movable contact 612 is fitted around plunger shaft 615 above stationary core 642 vertically slidable along plunger shaft 615. Upper movable contact 612, as shown in FIG. 16, is limited by stopping ring 616 fitted to the upper end of plunger shaft 615 so that it does not move upward of the upper end of plunger shaft 615. As a result, upper movable contact 612 is vertically slidable along plunger shaft 615 between stopping ring 616 and stationary core 642. Upper movable contact 612 is urged upward at all times by contact pressure spring 670 comprising a compression spring fit to plunger shaft 615.

Upper movable contact 612 is made of a metal such as copper having excellent electrical conductivity, and when both ends of upper movable contact 612 move upward, upper movable contact 612 abuts with two abutting portions 631 of fixed contact 630. Lead wires 910*a* of a pair of brushes 910 are electrically and mechanically fixed to upper movable contact 612 by caulking or welding or the like. Also, the end portion of resistor member 617 constituting a plurality (in the present embodiment, two) of current limiting means is inserted and electrically and mechanically fixed in a groove portion of upper movable contact 612.

Lead wires 910*a* are electrically and mechanically fixed to upper movable contact 612 by caulking or welding, but upper movable contact 612 and lead wires 910*a* of brushes 910 may be formed integrally.

Resistor member 617 rotates motor 500 at a low speed when the starter begins operation, and consists of a metal wire of high resistance wound through several turns. Lower movable contact 611 located below head portion 621 of terminal bolt 620 is fixed by caulking or the like to the other end of resistor member 617.

Lower movable contact 611 is made of a metal such as copper having excellent conductivity. When magnet switch 600 stops and plunger 610 is in its downward position, plunger 610 abuts with the upper surface of stationary core 642. When resistor member 617 moves upward with movement of plunger shaft 615, before upper movable contact 612 abuts with abutting portion 631 of fixed contact 630 it abuts with head portion 621 of terminal bolt 620.

The lower surface of plunger 610 is provided with recess portion 682 which accommodates sphere 681 provided at the rear end of cord-shaped member 680 (for example a wire). Female thread 683 is formed on the inner wall of recess portion 682. Fixing screw 684 which fixes sphere 681 in recess portion 682 is screwed into recess portion 682. Fixing screw 684 also performs adjustment of the length of cord-shaped member 680, by adjusting the extent to which fixing screw 684 is screwed into female thread 683. The length of cord-shaped member 680 is adjusted so that when plunger shaft 615 moves upward and lower movable contact 611 abuts with terminal bolt 620, limiting claw 231 of pinion rotation limiting member 230 mates with projections 214 of the outer periphery of pinion gear 210. Female thread 683 and fixing screw 684 constitute an adjusting mechanism.

With such a construction, because with respect to the movement of plunger 610 of magnet switch 600, via cord-shaped member 680, pinion rotation limiting member 230 is moved to the side of pinion gear 210, conventional link mechanisms and levers and the like are not necessary and the number of parts can be reduced. Also, even if pinion gear 210 fails to detach from ring gear 100, bending in cord-shaped member 680 itself causes plunger 610 to return to its original position, and upper movable contact 612 can detach from fixed contact 630.

Also, because all that is necessary is to cause limiting claw 231 of pinion rotation limiting member 230 to engage with projections 214 on pinion gear 210, limiting claw 231 can be reliably moved by cord-shaped member 680. By making cord-shaped member 680 a wire, the durability can be increased. Also, by disposing the adjusting mechanism including female thread 683 and fixing screw 684 between plunger 610 and cord-shaped member 680 and screwing fixing screw 684 into female thread 683, the length of cord-shaped member 680 can be easily set.

Furthermore, because plunger shaft 615 of magnet switch 600 is disposed substantially vertically, compared to a case wherein plunger shaft 615 of magnet switch 600 is disposed axially, the axial direction dimension of the starter can be shortened and the stroke through which plunger shaft 615 is required to pull cord-shaped member 680 can be reduced. Further downsizing of magnet switch 600 can be achieved with the structures described above.

Furthermore, because magnet switch 600 is disposed orthogonal with respect to the axial direction of armature shaft 510, only the length of diameter of magnet switch 600 adds to the axial direction length of the overall starter, thus keeping the entire starter's size smaller than in conventional starters.

End Frame

Figure 18:
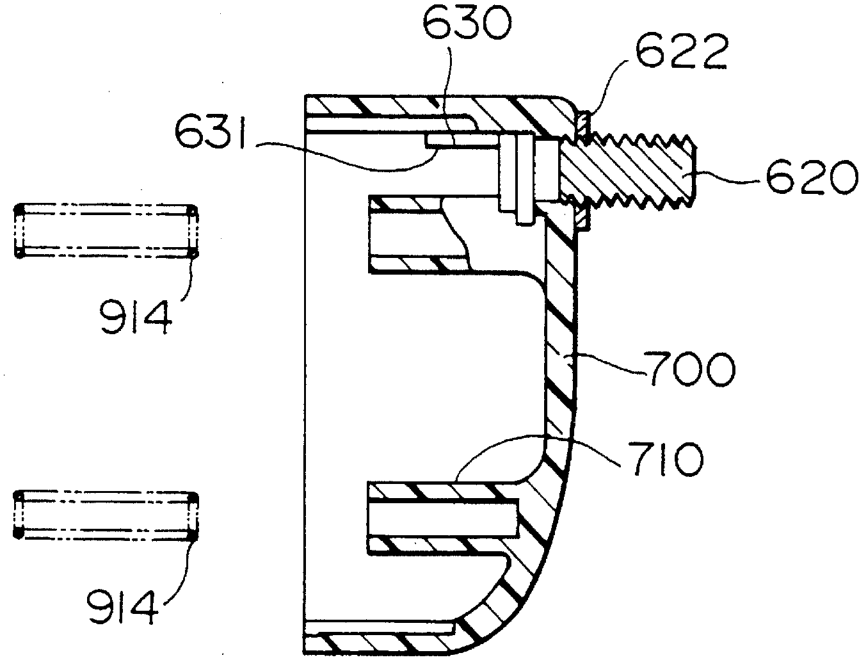
FIG. 18 is a sectional view of an end frame and a brush spring.

End frame 700, as shown in FIG. 18, is a magnet switch cover made of resin, e.g. phenol resin, and accommodates magnet switch 600. Spring holding pillars 710, which hold compression coil springs 914 that urge brush 910 forward, are mounted so as to project from the rear surface of end frame 700 in positions corresponding to the positions of brushes 910.

Also, compression coil springs 914, as shown in FIG. 1, are disposed diametrally outward with respect to the axial direction of plunger 610 of magnet switch 600.

Terminal bolt 620 is a steel bolt which passes through end frame 700 from the inside and projects from the rear of end frame 700 and has at its front end head portion 621 which abuts with the inner surface of end frame 700. Terminal bolt 620 is fixed to end frame 700 by caulking washer 622, which is attached to terminal bolt 620 projecting outside and rearward of end frame 700. Copper fixed contact 630 is fixed to the front end of terminal bolt 620 by caulking. Fixed contact 630 has one or a plurality, in this embodiment, two, of abutting portions 631 positioned at the top end of the inside of end frame 700, and abutting portions 631 are mounted so that the upper surface of upper movable contact 612, which is moved up and down by the operation of magnet switch 600, can abut with the lower surfaces of abutting portions 631.

Further, the spring length of compression coil spring 914 can use the radial direction length of the magnet switch 600, and a suitable spring stress and load can be set. Thus, the life of compression coil spring 914 can be greatly increased.

Also, because the space around the outside of magnet switch 600 is used effectively for compression coil spring 914, the length of compression coil springs 914 does not add to the axial direction length of the starter. Thus, this feature also contributes to the shortening of the starter according to the present invention.

Brush Holding Member

Brush holding member 900, separates the inside of the yoke 501 and the inside of the end frame 700 and rotatably supports the rear end of armature shaft 510 by way of brush holding member bearing 564. Brush holding member 900 also acts as a brush holder, a holder for magnet switch 600, and a holder for pulley 690, which guides cord-shaped member 680. Brush holding member 900 has a hole portion (not illustrated) through which cord-shaped member 680 passes.

Figure 19:
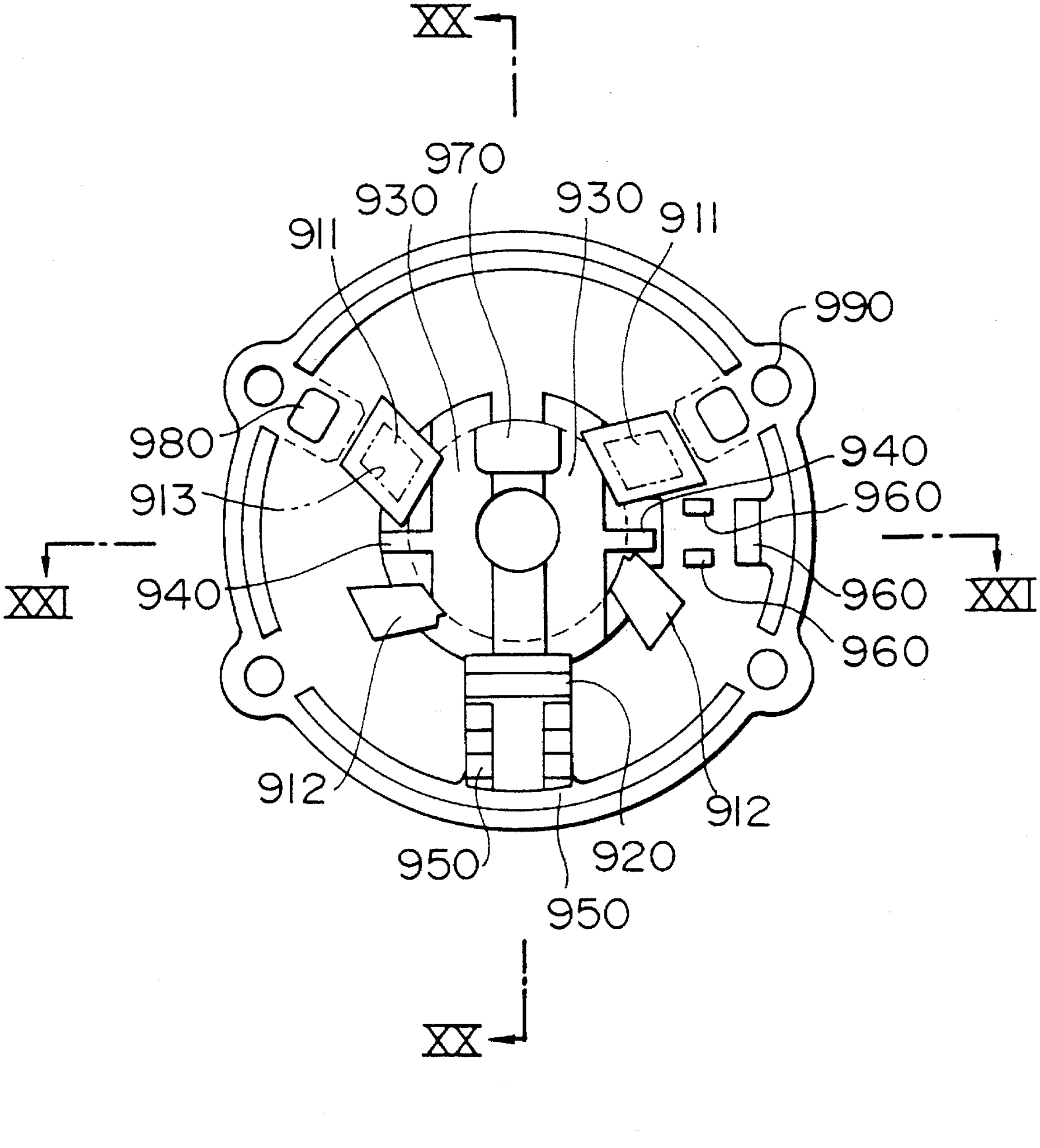
FIG. 19 is a front view of a brush holder.
Figure 20:
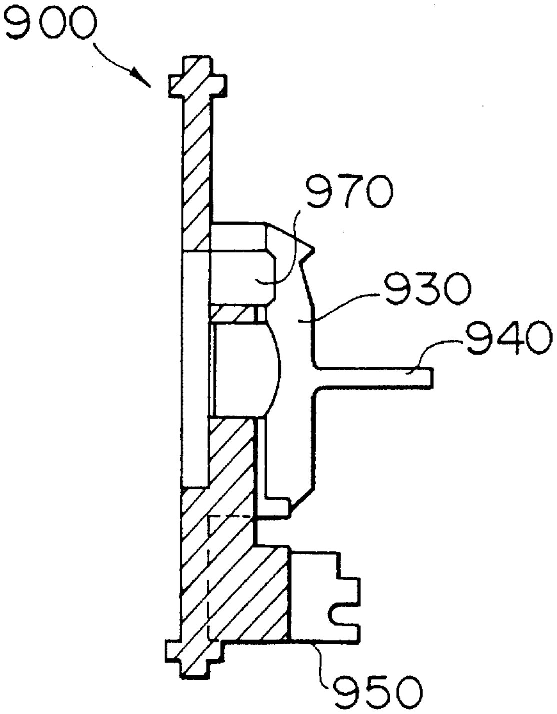
FIG. 20 is a sectional view along the X—X line of FIG. 19.
Figure 21:
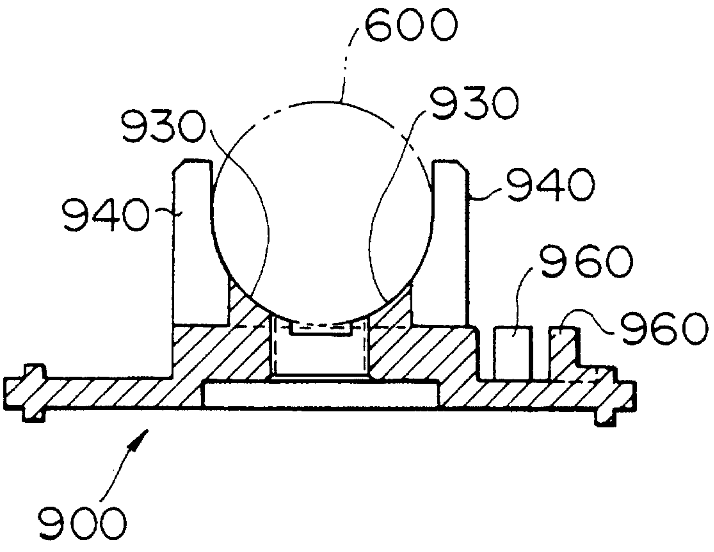
FIG. 21 is a sectional view along the XXI—XXI line of FIG. 19.

Brush holding member 900 is a spacing wall formed of a metal such as aluminum molded by a casting method. As shown in FIG. 19 through FIG. 21, where FIG. 20 is a cross-section taken along XX—XX of FIG. 19 and FIG. 21 is a cross-section taken along XXI—XXI of FIG. 19, brush holding member 900 has a plurality, in this embodiment, two upper and two lower, brush holding holes 911, 912 which hold brushes 910 in the axial direction. Upper brush holding holes 911 are holes which hold brush 910 that receives a positive voltage, and upper brush holding holes 911 hold brushes 910 by way of resin, e.g. nylon, phenol resin, insulating cylinders 913. Lower brush holding holes 912 are holes which hold brushes 910 connected to ground, and lower brush holding holes 912 hold respective brushes 910 directly therein.

In this way, by holding brushes 910 by means of brush holding member 900, there is no need to provide the starter with independent brush holders. As a result, the number of parts in the starter can be reduced and the number of man-hours required for assembly can be reduced. Brushes 910 are urged against upper layer coil ends 534 at rear ends of armature coils 530 by compression coil springs 914.

Lead wires 910*a* of upper brushes 910 are electrically and mechanically joined by a joining method such as welding or caulking to upper movable contact 612 which is moved by magnet switch 600. Lead wires 910*a* of the lower brushes 910 are caulked and thereby electrically and mechanically joined to concave portion 920 formed in the rear surface of brush holding member 900. In this embodiment a pair of lower brushes 910 are provided, one lead wire 910*a* is connected to the pair of lower brushes 910, and the middle of lead wire 910*a* is caulked in concave portion 920 formed in the rear surface of brush holding member 900.

Two seats 930 with which the front side of magnet switch 600 abuts and two fixing pillars 940, which hold the periphery of magnet switch 600, are formed on the rear side of brush holding member 900. Seats 930 are shaped to match the external shape of magnet switch 600 in order to abut with magnet switch 600, which has a cylindrical exterior. Fixing pillars 940, with magnet switch 600 in abutment with seats 930, by having their rear ends caulked to the inner side, hold magnet switch 600.

Pulley holding portion 950, which holds pulley 690 that converts the direction of movement of cord-shaped member 680 from the vertical direction of magnet switch 600 into the axial direction thereof, is formed on the lower side of the rear side of brush holding member 900.

Operation of the First Embodiment

Figure 22A:
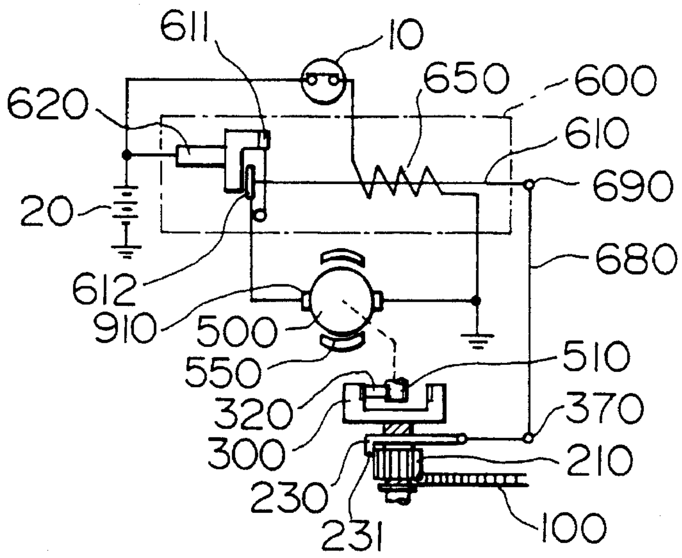
FIGS. 22A, 22B, and 22C are electrical circuit diagrams in which the operating state of a pinion is shown.

Next, operation of the starter described above will be explained with reference to the electrical circuit diagrams shown in FIGS. 22A through 22C. When key switch 10 is set to the start position by a driver as shown in FIG. 22A, electricity flows from battery 20 to attracting coil 650 of magnet switch 600. When current flows through attracting coil 650, plunger 610 is pulled by the magnetic force produced by attracting coil 650, and plunger 610 ascends from its lower position to its upper position or moves from right to left in FIG. 22A.

When plunger 610 starts to ascend, together with the ascent of plunger shaft 615, both upper movable contact 612 and lower movable contact 611 ascend, and the rear end of cord-shaped member 680 also ascends. When the rear end of cord-shaped member 680 ascends, the front end of cord-shaped member 680 is pulled down, and pinion rotation limiting member 230 descends. When the descent of pinion rotation limiting member 230 causes limiting claw 231 to mate with projections 214 of the periphery of pinion gear 210, lower movable contact 611 abuts with head portion 621 of terminal bolt 620 as shown in FIG. 22A. Current flows from battery 20 to terminal bolt 620, and the current is made to flow through lower movable contact 611 as follows. Current is made to flow to resistor member 617, and in turn to upper movable contact 612. From upper movable contact 612, current is made to flow to lead wires 910*a* leading to upper brushes 910. That is, the low voltage current passing through resistor member 617 is transmitted through upper brushes 910 to armature coils 530. Because the lower brushes 910 are constantly grounded through brush holding member 900, a current flows at a low voltage through armature coils 530 constituted in coil form by paired upper layer coil bars 531 and lower layer coil bars 532. When this happens, armature coils 530 generate a relatively weak magnetic force that acts on, i.e. attracts or repels, the magnetic force of fixed poles 550. Thus, armature 540 rotates at low speed.

When armature shaft 510 rotates, planetary gears 320 of planetary gear mechanism 300 are rotationally driven by sun gear 310 on the front end of armature shaft 510. When planetary gears 320 exert a rotational torque through planet carrier 330 on internal gear 340 in the direction which rotationally drives ring gear 100, the rotation of internal gear 340 is limited by the operation of overrunning clutch 350. That is, because internal gear 340 does not rotate, the rotation of planetary gears 320 causes planet carrier 330 to rotate at low speed. When planet carrier 330 rotates, pinion gear 210 also rotates, but because pinion gear 210 has its rotation limited by pinion rotation limiting member 230, pinion gear 210 advances along helical spline 221 on output shaft 220.

Together with the advance of pinion gear 210, shutter 420 also advances, and opens opening portion 410 of housing 400. The advance of pinion gear 210 causes pinion gear 210 to mesh completely with ring gear 100 and then abut with pinion stopping ring 250. Also, when pinion gear 210 advances, limiting claw 231 disengages from projections 214 of pinion gear 210. Then, the front end of limiting claw 231 drops to the fear side of washer 215 disposed on the rear side of pinion gear 210.

Figure 22B:
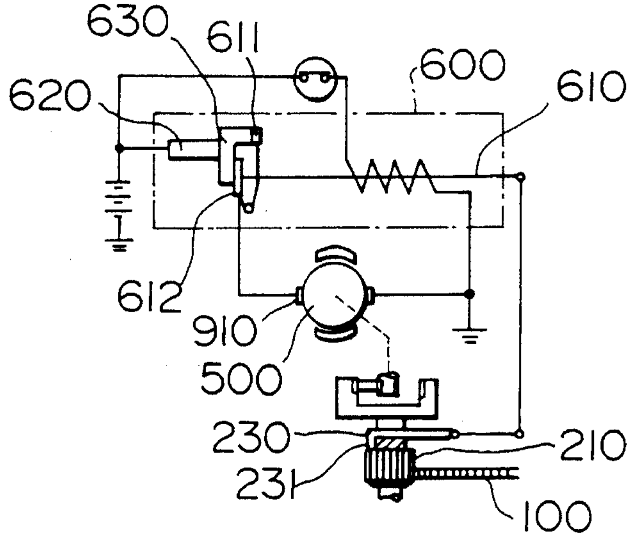

With pinion gear 210 advanced, upper movable contact 612 abuts with fixed contact 630 as shown in FIG. 22B. When this happens, the battery voltage of terminal bolt 620 is directly transmitted through upper movable contact 612 to lead wires 910*a* leading to upper brushes 910. That is, a high current flows through armature coils 530 comprising coil bars 531 and coil bars 532, armature coils 530 generate a strong magnetic force and armature 540 rotates at high speed.

The rotation of armature shaft 510 is reduced in its speed and has its rotational torque increased by planetary gear mechanism 300 and rotationally drives planet carrier 330. At this time, the front end of pinion gear 210 abuts with pinion stopping ring 250 and pinion gear 210 rotates integrally with planet carrier 330. Because pinion gear 210 is meshing with ring gear 100 of the engine, pinion gear 210 rotationally drives ring gear 100 and rotationally drives the output shaft of the engine.

Next, when the engine starts and ring-gear 100 of the engine rotates faster than the rotation of pinion gear 210, the action of helical spline 221 creates a force tending to retract pinion gear 210. However, limiting claw 231 which has dropped to behind pinion gear 210 prevents pinion gear 210 from retracting, prevents early disengagement of pinion gear 210, and enables the engine to be started surely.

When the starting of the engine causes ring gear 100 to rotate faster than the rotation of pinion gear 210, the rotation of ring gear 100 rotationally drives pinion gear 210. When this happens, the rotational torque transmitted from ring gear 100 to pinion gear 210 is transmitted through planet carrier 330 to pin 332 which supports planetary gears 320. That is, planetary gears 320 are driven by planet carrier 330. When this happens, because a torque rotationally opposite to that which occurs during engine starting is exerted on internal gear 340, overrunning clutch 350 allows the rotation of ring gear 100. That is, when a torque rotationally opposite to that during engine starting is exerted on internal gear 340, roller 353 of overrunning clutch 350 detaches to outside concave portion 355 of clutch inner member 352 and rotation of internal gear 340 becomes possible.

In other words, the relative rotation with which ring gear 100 rotationally drives pinion gear 210 when the engine starts is absorbed by overrunning clutch 350, and armature 540 is never rotationally driven by the engine.

Figure 22C:
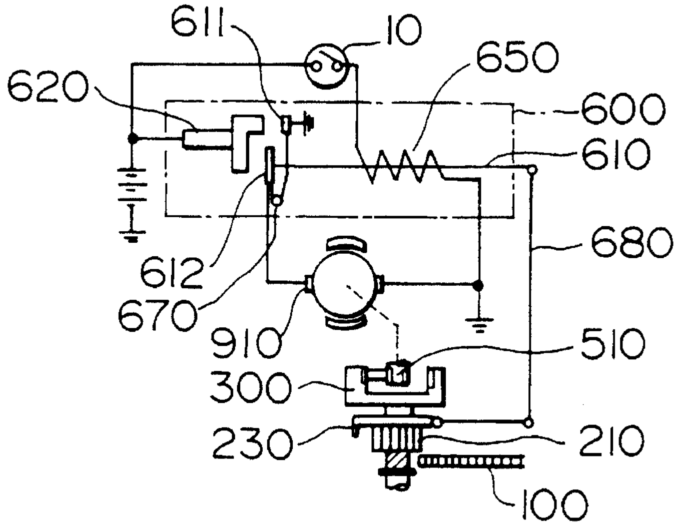

When the engine starts, the driver releases key switch 10 from the start position as shown in FIG. 22C and the flow of current to attracting coil 650 of magnet switch 600 is stopped. When the flow of current to attracting coil 650 stops, plunger 610 is returned downward by the action of compression coil spring 660.

When this happens, upper movable contact 612 moves away from fixed contact 630, and after that lower movable contact 611 also moves away from terminal bolt 620, and the flow of current to upper brushes 910 is stopped.

When plunger 610 is returned downward, the action of end portion 236 of pinion rotation limiting member 230 causes pinion rotation limiting member 230 to move back upward, and limiting claw 231 moves away from the rear of pinion gear 210. When this happens, pinion gear 210 is returned rearward by the action of return spring 240, the meshing of pinion gear 210 with ring gear 100 of the engine is disengaged, and the rear end of pinion gear 210 abuts with the flange-like projecting portion of output shaft 220. That is, pinion gear 210 is returned to the position it was in before the starter was started.

Also, the return of plunger 610 downward causes lower movable contact 611 to abut with the upper surface of stationary core 642 of magnet switch 600. The lead wires of upper brushes 910 conduct electrical current in the following order. From upper movable contact 612 to the resistor member 617, and then to lower movable contact 611, voltage is then transmitted to stationary core 642. Stationary core 642 transmits voltage to magnet switch cover 640, which in turn transmits voltage to brush holding member 900. In other words, upper brushes 910 and lower brushes 910 short-circuit through brush holding member 900. Meanwhile, inertial rotation of armature 540 generates an electromotive force in armature coils 530. Because this electromotive force is short-circuited through upper brushes 910, brush holding member 900, and lower brushes 910, a braking force is exerted on the inertial rotation of armature 540. As a result, armature 540 rapidly stops rotation.

In the starter of this embodiment, by disposing magnet switch 600 in the vicinity of the opposite end of starter motor 500 to pinion gear 210 with the plunger 610 orthogonal to armature shaft 510 of motor 500, it is possible to use the diameter of starter motor 500 effectively for the movement of plunger 610, as plunger 610 can be accommodated within the diameter of motor 500. As a result, not only can the diameter of magnet switch 600 be reduced, but it is possible to reduce the length in the axial direction of the entire starter.

Also, by disposing part of cord-shaped member 680, which shifts pinion gear 210 beside ring gear 100 so that it extends axially between field poles 550 of the motor, without enlarging the diameter of shaft 510 of starter motor 500 and increasing the volume of the in diametral direction and making the construction complex as in the past, the construction is simple and extensions built in the diametral direction can be prevented.

Further, by moving pinion rotation limiting member 230 to the side of pinion gear 210 by means of the movement of plunger 610 via cord-shaped member 680, pinion rotation limiting member 230 can be moved with a simple construction using wire, and the laying of cord-shaped member 680 can also be made easy.

Also, because pinion rotation limiting member 230 has limiting claw 231, which engages with groove portion 213 of pinion gear 210, and by means of limiting claw 231, only pinion gear 210 is moved, the attractive force of magnet switch 600 need only be very small and consequently the number of turns of attracting coil 650 can be kept down, the diametral direction size of magnet switch 600 can be kept to a minimum and the axial direction length of the whole starter can be made small.

Also, because with one attracting coil 650 only, plunger 610 is moved by supplying current to attracting coil 650, the diameter of the coil can be made small, and overall, the diametral directional length of the magnet switch 600 can be kept down and the axial direction length of the entire starter can be made small.

By plunger 610 of magnet switch 600 being disposed along substantially the same direction as the piston direction of the engine, because the direction of vibration caused by pistons of the engine and the direction of movement of plunger 610 are the same, the same reduces vibration to sleeve 651 mounted around the inside of the coil for allowing plunger 610 in magnet switch 600 to slide, and a magnet switch 600 which is kept stable over long periods can be provided.

Furthermore, by terminal bolt 620 connected to the battery being mounted so as to project substantially axially from the opposite side of end frame 700 covering magnet switch 600 to starter motor 500, the battery cable for connecting the battery to the terminal bolt 620 can be kept away from field poles 550 of the starter motor 500, and the field around the battery cable during starter operation can be prevented from altering the magnetic flux of field poles 550 and reducing the output of the starter.

Also, by having terminal bolt 620 project substantially axially, the surface to which the battery cable is fit can be made to project from the end surface of the side of cover 700 opposite to the starter motor side. Further, the battery cable can be easily fit to the fixed terminal from any direction around about 360° and therefore the wireability is excellent.

Other Embodiments of Magnet Switch Arrangement

Figure 23:
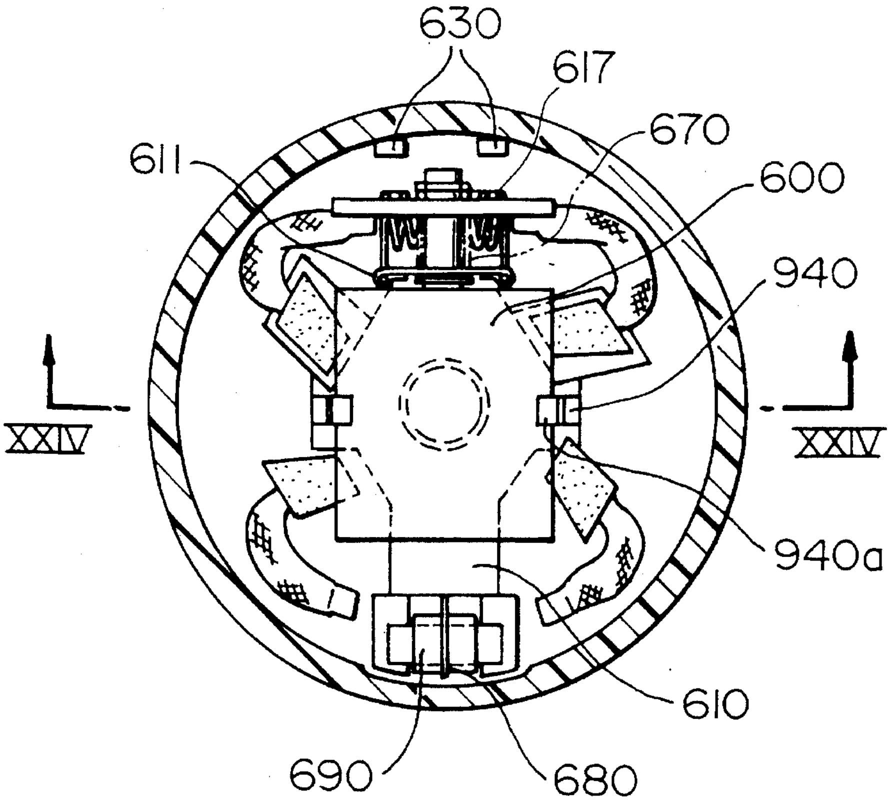
FIG. 23 is a cross-sectional view showing a magnet switch arrangement according to the second embodiment of the invention.
Figure 24:
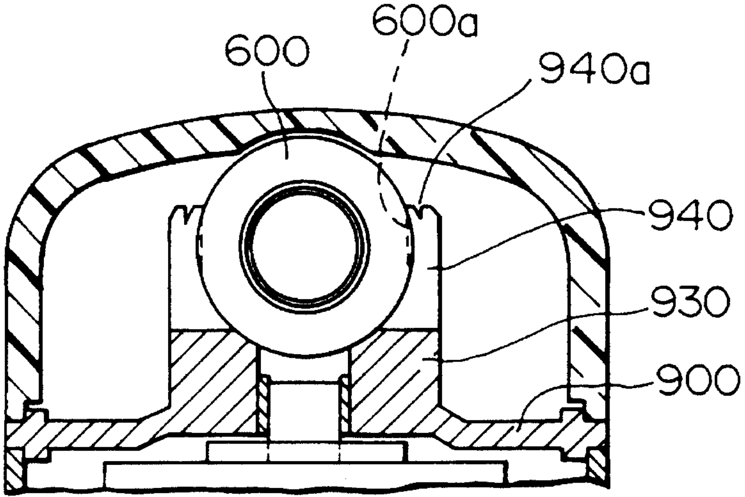
FIG. 24 is a cross-sectional view viewed in an arrow direction XXIV—XXIV in FIG. 23.

In FIGS. 23 and 24 showing magnet switch arrangement according to the second embodiment in particular, the magnet switch 600 is formed with an engagement grooves 600*a* on its outer circumferential periphery to engage with a fixed pillar 940. The fixed pillar 940 has top ends 940*a* which are divided and caulked into engagement grooves 600*a* so that magnet switch 600 is fixed to brush holder 900.

Figure 25:
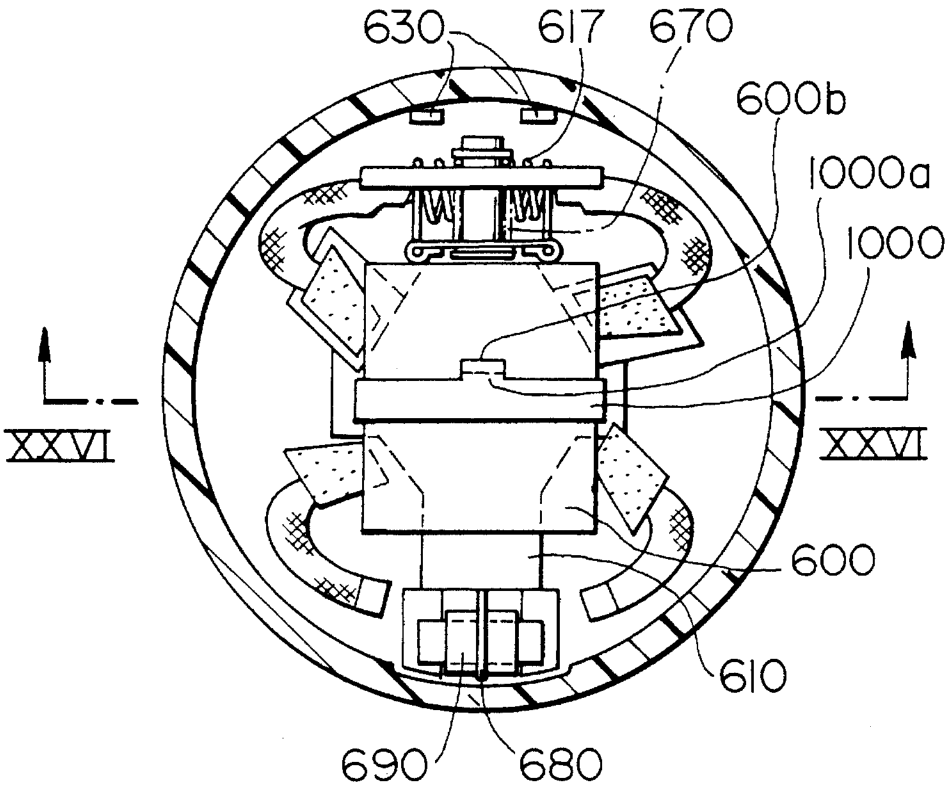
FIG. 25 is a cross-sectional view showing a magnet switch arrangement according to the third embodiment of the invention.
Figure 26:
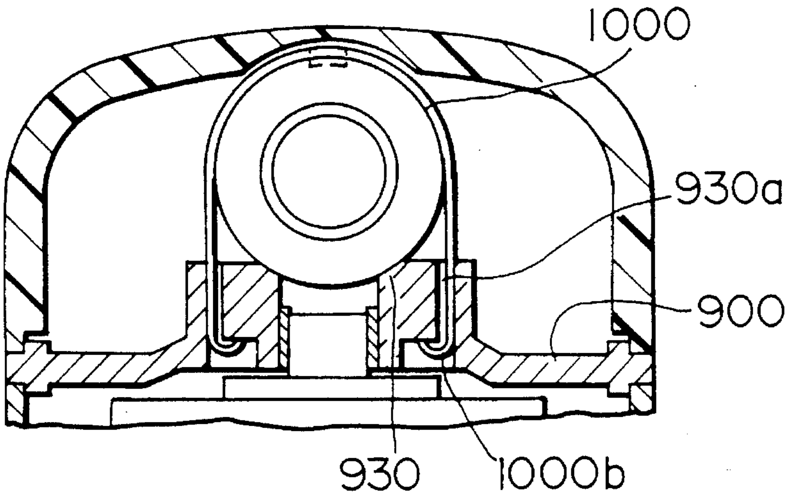
FIG. 26 is a cross-sectional view viewed in an arrow direction XXVI—XXVI in FIG. 25.

In FIGS. 25 and 26 showing magnet switch arrangement according to the third embodiment, magnet switch 600 is held in position to base 930 of brush holder 900 by a belt-like member 1000. Belt-like member 1000 has a positioning protrusion 1000*a* protruding towards its inner peripheral portion from its side face so that positioning protrusion 1000*a* engages with positioning engagement groove 600*b* formed on outer periphery of magnet switch 600. Belt-like member 1000 (small diameter iron wire, for instance) has free ends 1000*b* inserted into through holes 930*a* of base 930 and bent and caulked inwardly to securedly holding magnet switch 600. According to this arrangement, since magnet switch 600 is wound at its outer periphery by belt-like member 1000 fixed to brush holder 900, magnet switch 600 can be fixed with ease and belt-like member 1000 can absorb vibration which will otherwise exerts on magnet switch 600.

Figure 27:
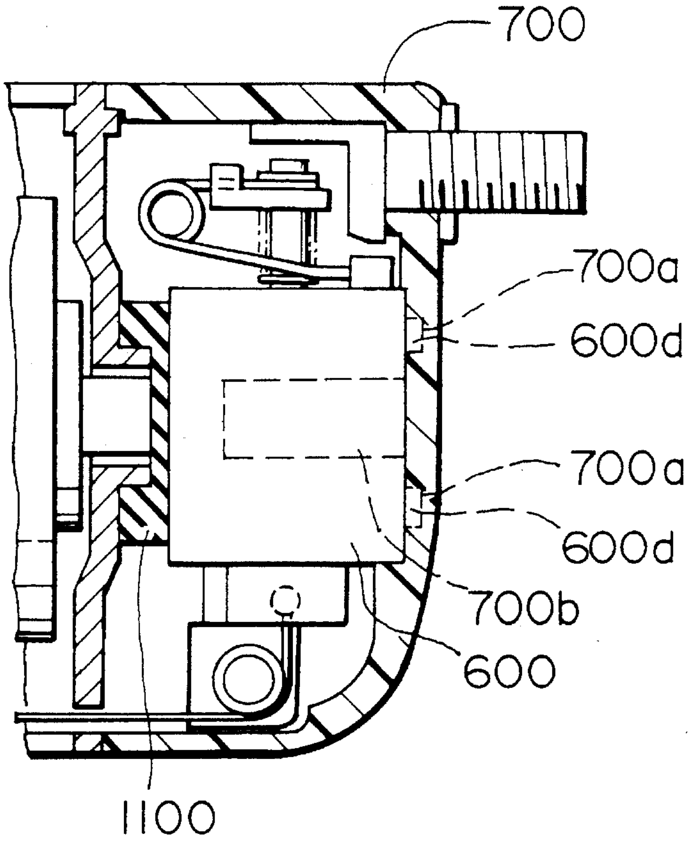
FIG. 27 is a cross-sectional view showing a magnet switch arrangement according to the fourth embodiment of the invention.
Figure 28:
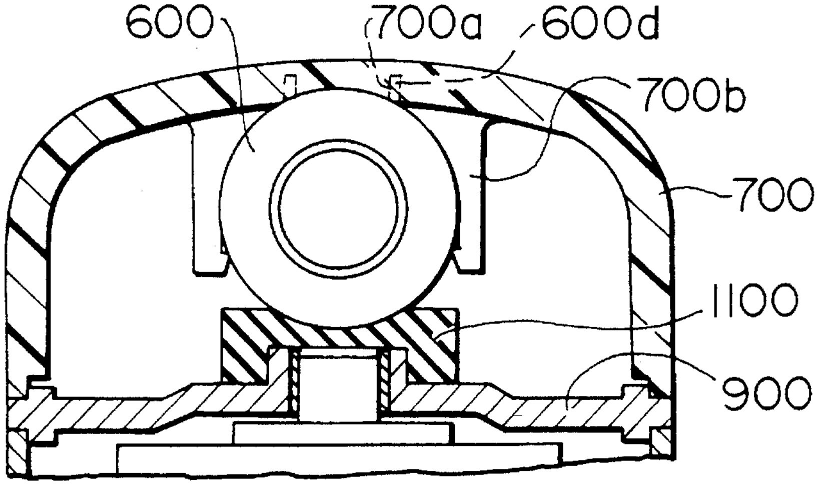
FIG. 28 is an another cross-sectional view of the magnet switch arrangement shown in FIG. 27.

In FIGS. 27 and 28 showing the magnet switch arrangement according to the fourth embodiment, magnet switch 600 is formed with first protrusions 600*d* on its outer periphery so that they may be engaged with engagement grooves 700*a* (four grooves in this embodiment) formed on the inner surface of end frame 700. End frame 700 has a base 700*b* extending axially inwardly and formed to correspond in shape with an outer shape of magnet switch 600 so that magnet switch 600 may be held tightly to base 700*b*. An elastic member (rubber, for instance) 1100 is interposed between magnet switch 600 and brush holder 900 to further tightly hold magnet switch 600. According to this embodiment, since elastic member 1100 is interposed between magnet switch 600 and brush holder 900 vibration which will otherwise exert on magnet switch 600 is effectively absorbed and reduced with ease.

Figure 29:
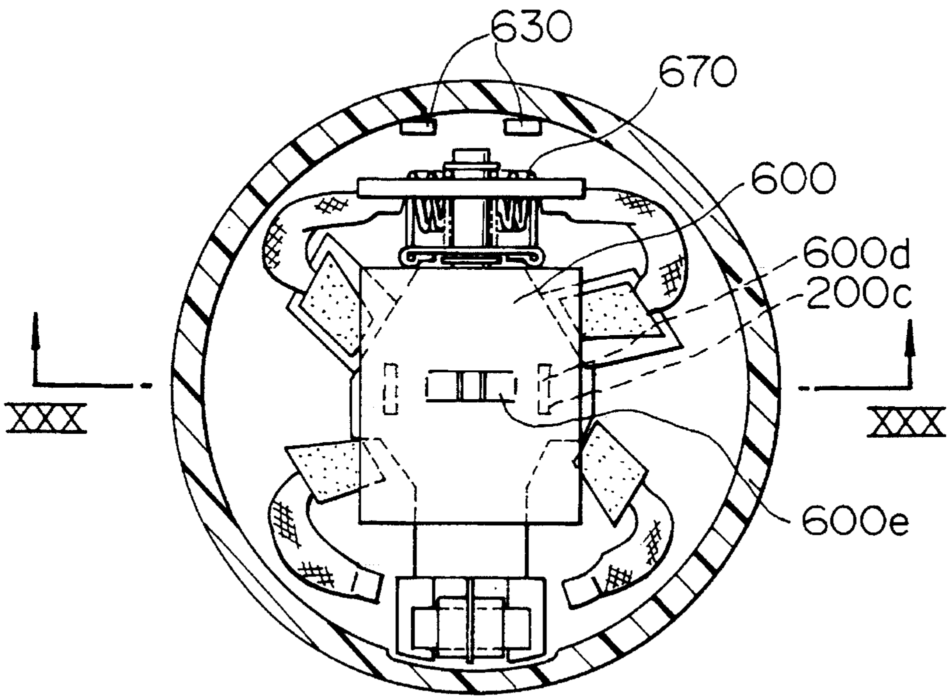
FIG. 29 is a cross-sectional view showing a magnet switch arrangement according to the fifth embodiment of the invention.
Figure 30:
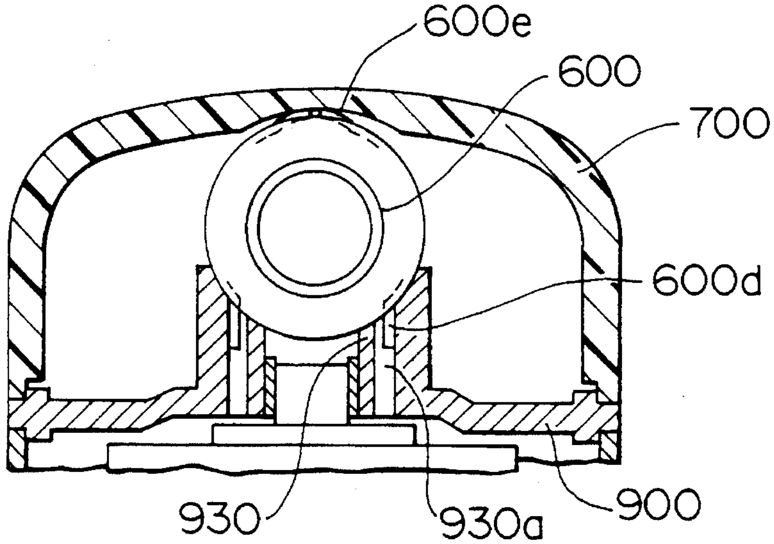
FIG. 30 is a cross-sectional view viewed in an arrow direction XXX—XXX in FIG. 29.

In FIGS. 29 and 30 showing the magnet switch arrangement according to the fifth embodiment, magnet switch 600 is held by base 930 of brush holder 900. Magnet switch 600 has first protrusions 600*d* on its outer periphery and protrusions 600*d* engages with through holes 930*a* of base 930. At a part of outer periphery of magnet switch 600 at the side of end frame 700, magnet switch 600 is formed with second protrusions (two protrusions in this embodiment) 600*e* which contact inner face of end frame 700 and magnet switch 600 is tightly fixed by means of elasticity of second protrusions 600*e*. It is to be understood here that second protrusions 600*e* accept dimensional tolerances of component parts at the time of fixing magnet switch 600 to end frome 700.

Figure 31:
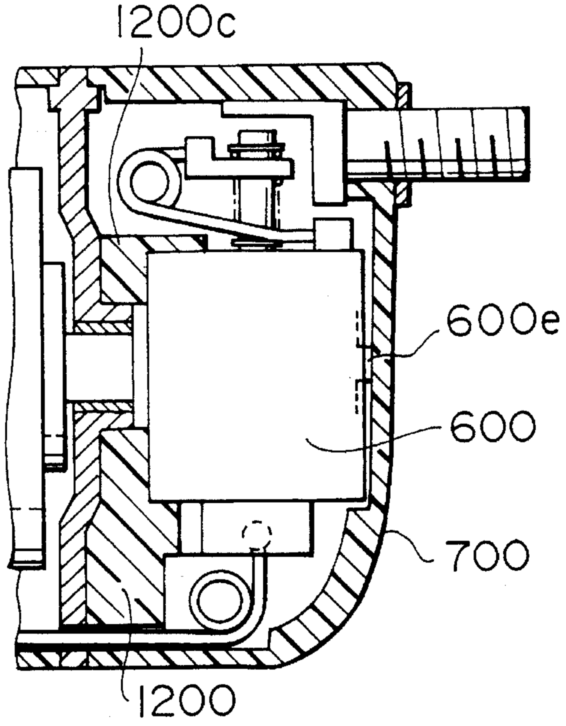
FIG. 31 is a cross sectional view showing a magnet switch arrangement according to the sixth embodiment of the invention.
Figure 32:
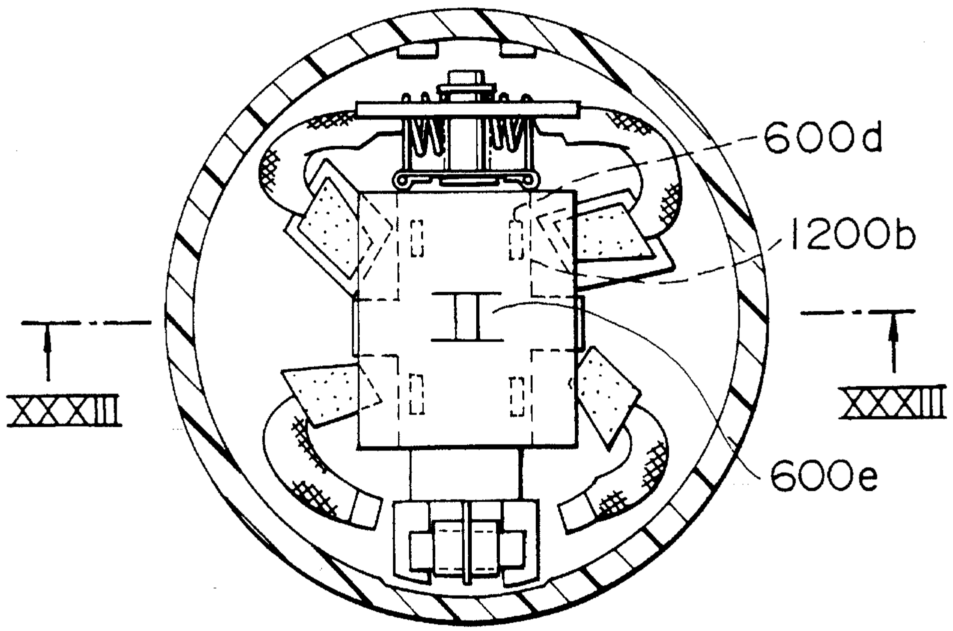
FIG. 32 is another cross-sectional view of the magnet switch arrangement shown in FIG. 31.
Figure 33:
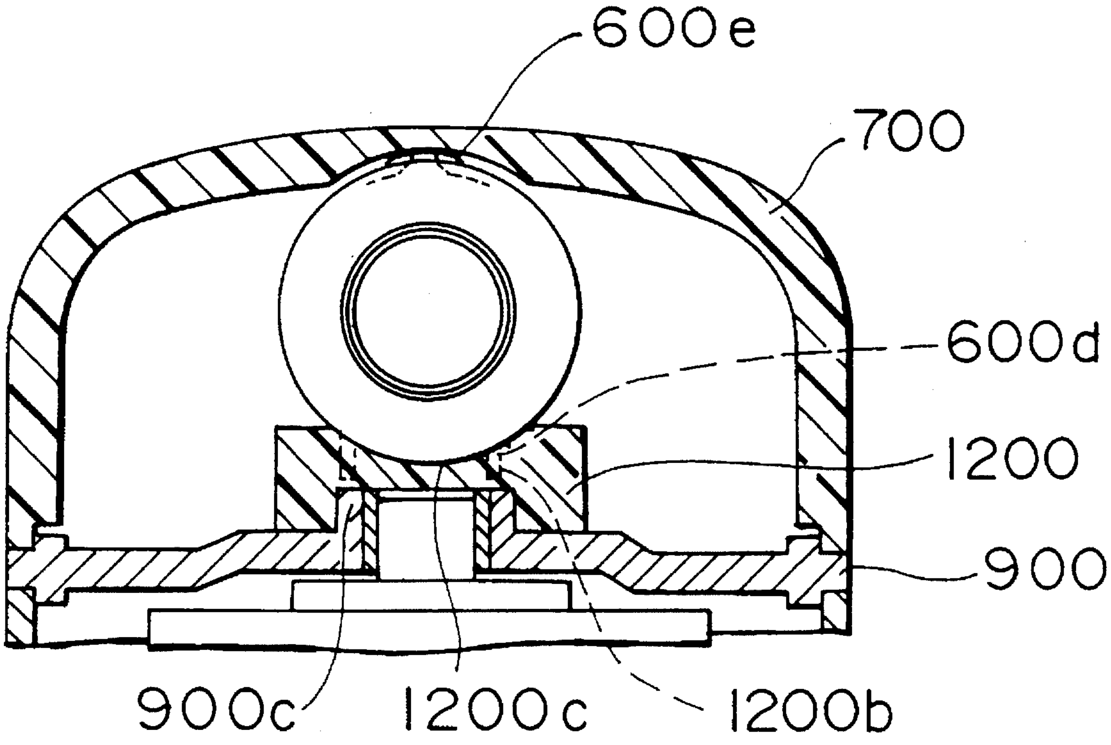
FIG. 33 is a cross-sectional view viewed in an arrow direction XXXIII—XXXIII in FIG. 31.

In FIGS. 31 through 33 showing magnet switch arrangement according to the sixth embodiment, as in the fifth embodiment, second protrusions 600*e* are formed, on the outer periphery of magnet switch 600 at the side of end frame 700, which extend toward end frame 700. Further, first protrusions 600*d* (four protrusions in this embodiment) are formed to engage with grooves 1200*b* formed on magnet switch holder 1200. Magnet switch holder 1200 is press fitted into an outer periphery of ring portion 900*c* of brush holder 900. Outer periphery of brush holder 900 is fitted into a concave or recessed portion 1200*c* of magnet switch holder 1200. Magnet switch 600 is held by magnet switch holder 1200. First protrusions 600*d* of magnet switch 600 engages with grooves 1200*b* of magnet switch holder 1200 and second protrusions 600*e* of magnet switch 600 contacts with inner surface of end frame 700 so that magnet switch 600 may be fixed tightly. According to this embodiment, since magnet switch holder 1200 is interposed between magnet switch 600 and brush holder 900 and the outer periphery of magnet switch 600 is press fitted into recessed portion 1200*c* of magnet switch holder 1200, anti-vibration characteristic is improved with respect to either vertical and horizontal vibrations in particular.

Although second protrusions 600*e* are formed on magnet switch 600 in this embodiment, an elastic member in place thereof may be interposed between magnet switch 600 and end frame 700.

By the above-described arrangements according to the second through sixth embodiments, magnet switch 600 can be tightly fixed to corresponding component parts and hence the the anti-vibration characteristic of magnet switch 600 can be advantageously and greatly improved.

This invention has been described in connection with what is presently considered to be the most practical and preferred embodiment. However, the invention is not intended to be limited to the disclosure. Rather, the disclosure is intended to cover all modifications and equivalent arrangements included within the spirit and scope of the appended claims.

What is claimed is:

1. A starter for starting an engine including a ring gear, said starter comprising:

a starter motor having a plurality of field poles disposed around an inner periphery thereof and an armature rotatably disposed in an inner periphery of said field poles;

an output shaft driven by rotation of said armature of said starter motor;

a pinion mounted on said output shaft for meshing with said ring gear; and a magnet switch including a fixed contact and a plunger with a movable contact, which selectively abuts said fixed contact, actuation of said magnet switch moving said plunger and causing said movable contact to abut said fixed contact for passing electrical current to said armature of said starter motor, and said magnet switch being disposed in an end of said starter motor opposite an end where said pinion is disposed, with said plunger being disposed orthogonal to a longitudinal axis of said armature of said starter motor, said plunger being disposed movably within the confines of an outer periphery of said starter motor.

2. A starter according to claim 1, further comprising:

a moving mechanism, which by means of movement of said plunger shifts said pinion to a position beside said ring gear, a part of said moving mechanism being disposed so as to extend in parallel with a rotary axis of said armature and extending between said field poles.

3. A starter according to claim 2, wherein said moving mechanism includes:

a pinion limiting means for moving said pinion to said position beside said ring gear by means of rotation of said output shaft by abutting with said pinion and obstructing rotation of said pinion; and transmitting means having a first end fixed to said plunger and a second end fixed to said pinion limiting means so that said transmitting means shifts said pinion limiting means to a pinion side by movement of said plunger.

4. A starter according to claim 3, wherein said transmitting means comprises a wire.

5. A starter according to claim 3, wherein said pinion limiting means includes a limiting claw and said pinion includes a groove formed therein, wherein said limiting claw engages with said groove portion in said pinion thereby to limit rotation of the pinion and allow rotation of the output shaft to advance the pinion, and wherein only said pinion is shifted by means of said claw.

6. A starter according to claim 3, wherein said magnet switch includes a fixed coil disposed around an outer periphery of said plunger, and wherein in order to move said pinion limiting means, current is supplied to the fixed coil, a magnetic force generated thereby moving said plunger and causing said movable contact to abut with said fixed contact.

7. A starter according to claim 1, wherein said starter motor is oriented so that said plunger is disposed in substantially the same direction as a piston direction of said engine.

8. A starter according to claim 1, further comprising:

a cover having a diameter substantially the same as a diameter of said starter motor and covering therein said magnet switch; and a terminal bolt fixed to said fixed contact at one end thereof to be connectable to a battery, said terminal bolt projecting substantially axially from a side opposite to said starter motor through said cover.

9. A starter according to claim 1, wherein said magnet switch has one of a groove and a protrusion on an outer periphery thereof which is fixed by engagement with a brush holder which holds a brush for supplying electrical current to said starter motor.

10. A starter according to claim 9 further comprising:

a magnet switch holder interposed between said magnet switch and said brush holder for holding said magnet switch, said magnet switch holder being formed with a recessed portion and said outer periphery of said magnet switch is press fitted into said recessed portion.

11. A starter according to claim 9 further comprising:

a belt-like member fixed to said brush holder for holding and covering said outer periphery of said magnet switch tightly.

12. A starter according to claim 9 further comprising:

an elastic member interposed between said magnet switch and said brush holder.

13. A starter for starting an engine including a ring gear, said starter comprising:

a starter motor having an armature core;

an output shaft disposed coaxially with said armature core at one axial side of said armature core of said starter motor to be driven by said armature core;

a pinion mounted on said output shaft for meshing with said ring gear for starting said engine;

a moving mechanism for moving said pinion to said ring gear when driven;

magnetic drive means disposed radially centrally relative to a rotary axis of said armature core at the other axial side of said armature core of said starter motor and having a movable member disposed movably in an orthogonal direction to said rotary axis for driving said moving mechanism; and wire means connecting said moving mechanism and said movable member bypassing a radial outside of said armature core from said one axial side to said the other axial side of said armature core.

14. A starter according to claim 13 further comprising:

a first cylindrical member encasing said starter motor therein; and a second cylindrical member having a diameter substantially the same as a diameter of said first cylindrical member and fixed to said first cylindrical member and coaxial thereto, said second cylindrical member encasing said magnetic drive means therein.

15. A starter for starting an engine having a ring gear, said starter comprising:

a starter motor having a cylindrical yoke, a plurality of magnetic poles disposed around an inner periphery of said yoke and an armature rotatably disposed in an inner periphery of said magnetic poles;

an output shaft operatively coupled to so as to be rotated by said armature of said starter motor;

a pinion disposed on said output shaft at one axial side of said armature for engagement with said ring gear of said engine; and a magnet switch having an attraction coil, a plunger disposed movably in an inner periphery of said attraction coil and orthogonally to a rotary axis of said armature of said starter motor at the other axial side of said armature which is opposite to said pinion, a movable contact coupled with said plunger, a fixed contact connectable to a battery, and an end frame supporting said fixed contact thereon to be contacted by said movable contact and encasing said attraction coil, plunger and movable contact therein, wherein said end frame is fixed to close an axial open end of said yoke at a position adjacent to the other axial side end of said yoke, and wherein said plunger moves said movable contact to contact said fixed contact so that said armature is energized by said battery through said movable and fixed contacts.

16. A starter according to claim 15, further comprising:

a terminal bolt electrically connected to said fixed contact and electrically connectable to said battery, said terminal bolt being fixed to said end frame at an axial end portion of said end frame which is axially opposite to a portion of said end frame fixed to said yoke.

17. A starter according to claim 16, wherein said end frame has a cylindrical portion fixed to said yoke coaxially and a side axial end portion which supports said terminal bolt axially.

18. A starter according to claim 15, further comprising:

a moving mechanism for moving said pinion axially to a side of said ring gear by a movement of said plunger of said magnet switch, a part of said moving mechanism being disposed between circumferentially adjacent two of said poles and extending axially along said rotary axis of said armature.

* * * * *